(12) United States Patent  (10) Patent No.: US 7,520,512 B2
Campbell et al.  (45) Date of Patent: Apr. 21, 2009

(54) DRILL CHUCK

(75) Inventors: David C. Campbell, Bel Air, MD (US); Warren A. Ceroll, Owing Mills, MD (US); Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 609 days.

(21) Appl. No.: 11/357,923

(22) Filed: Feb. 17, 2006

(65) Prior Publication Data

US 2006/0186613 A1  Aug. 24, 2006

Related U.S. Application Data

(60) Provisional application No. 60/655,767, filed on Feb. 24, 2005, provisional application No. 60/654,852, filed on Feb. 18, 2005.

(51) Int. Cl.
  *B23B 31/16* (2006.01)
(52) U.S. Cl. .................. 279/62; 279/60; 279/61
(58) Field of Classification Search ............ 279/60, 279/61, 62, 134, 140, 157, 902
  See application file for complete search history.

(56) References Cited

U.S. PATENT DOCUMENTS

| 4,275,893 | A | 6/1981 | Bilanceri |
| 4,305,597 | A | 12/1981 | McCarty |
| 4,848,779 | A | 7/1989 | Wheeler et al. |
| 5,195,760 | A | 3/1993 | Wheeler et al. |
| 5,988,653 | A | 11/1999 | Kuo |
| 5,992,859 | A | 11/1999 | Lin |
| 6,241,260 | B1 | 6/2001 | Judge et al. |
| 6,247,706 | B1 | 6/2001 | Kuo |
| 6,257,596 | B1 | 7/2001 | Yang |
| 6,261,035 | B1 | 7/2001 | Moores, Jr. et al. |
| 6,474,656 | B1 | 11/2002 | Thomas |
| 6,488,286 | B2 | 12/2002 | Yaksich |
| 6,517,295 | B2 | 2/2003 | Lin |
| 6,517,297 | B2 | 2/2003 | Cochran et al. |
| 6,688,611 | B2 | 2/2004 | Gifford et al. |
| 6,729,812 | B2 | 5/2004 | Yaksich et al. |
| 6,902,358 | B2 | 6/2005 | Thomas |

*Primary Examiner*—Sam Chuan Yao
*Assistant Examiner*—John Becker
(74) *Attorney, Agent, or Firm*—Harness, Dickey & Pierce, P.L.C.

(57) ABSTRACT

A drill chuck with an impacting structure that may be selectively employed to drive the jaws of the chuck into further engagement with or out of engagement with a bit. The chuck is configured so as to be capable of generating relatively high torques in a loosening direction so as to ensure that the bit can be removed from the jaws of the chuck.

7 Claims, 16 Drawing Sheets

DRILL CHUCK

CROSS-REFERENCE TO RELATED APPLICATIONS

This application claims the benefit of U.S. Provisional Patent Application No. 60/655,767 filed Feb. 24, 2005 entitled "Drill Chuck" and U.S. Provisional Patent Application Ser. No. 60/654,852, filed Feb. 18, 2005 entitled "Non-Slip Reverse Device for Impacting-Type Chuck", the disclosures of which are hereby incorporated by reference as if fully set forth herein.

INTRODUCTION

The present invention generally relates to a drill chuck for use with electric or pneumatic drill/drivers and more particularly to a drill chuck that employs an impacting ring to tighten or loosen the jaws of the drill chuck against the shank of a tool bit.

Impact-type drill chucks, such as those which are described in U.S. Pat. Nos. 6,247,706 and 6,729,812, the disclosures of which are hereby incorporated by reference as if fully set forth in their entirety herein, employ an impacting ring that may be axially moved into a position where teeth on the impacting ring strike corresponding teeth that are formed on a nut that threadably engages the jaws of the drill chuck.

With reference to FIG. 1, one such prior art drill chuck is generally indicated by reference numeral 1000. The drill chuck 1000 includes a spindle 1020, a plurality of jaw members 1022, a threaded socket 1024, a socket cover 1026, a thrust bearing assembly 1028, a cover shell or housing 1030, and a sleeve 1032.

The spindle 1020 can have a forward section 1040, a collar 1042 and a rearward section 1044. The forward section 1040 can have a center through hole 1046 formed therein, while the collar 1042 can have a plurality of angularly disposed guide channels 1048 formed therethrough which intersect the center through hole 1046. The rearward section 1044 can have a threaded hole 1050, which is adapted to threadingly engage an output spindle of a power tool (not shown), and a snap ring groove 1051.

The jaw members 1022 can be slidably positioned in the guide channels 1048 and can each include a threaded surface 1053, which is formed on an outer side, and a gripping surface 1054, which is formed on a forward inner surface.

The threaded socket 1024 can be disposed about the spindle 1020 and can have an internally tapered and threaded surface 1053 that is threadably coupled with the threaded surfaces 1052 of the jaw members 1022. A plurality of recessed holes 1058 may be formed about the exterior of the threaded socket 1024, while a plurality of socket teeth 1060 can be formed on the rearward surface of the threaded socket 1024.

The socket cover 1026 can be mounted about the forward section 1040 of the spindle 1020 and can contact the threaded socket 1024 on a side opposite the socket teeth 60.

The thrust bearing assembly 1028 can include a spring 1070, an impacting ring 1072 and a joint member 1074.

The impacting ring 1072 can include an annular body 1080, one or more axially-extending guide members 1082 that can be coupled to the annular body 1080, and a plurality of ring teeth 1092 that extend from a forward side of the annular body 1080. The guide member 1082 can include a tooth-like projection 1086 having tapered sides 1088. The ring teeth 1092 are configured so as to be capable of engaging the socket teeth 1060, as will be described in detail, below.

The spring 1070 can be disposed about the spindle 1020 and can abut joint member 1074 on the rearward side. The forward side of the spring 1070 can abut the rearward side of the annular body 1080 of the impacting ring 1072 and bias the impacting ring 1072 toward the threaded socket 1024. The joint member 1074 can be fixedly (i.e., non-rotatably) coupled to the housing of the of the drill (not shown) in a conventional and well known manner. For example, the rearward extending legs of joint member 1074 can have a slot or feature that engages a rib or projection in the housing of the drill (not shown) or, the rearwardly extending legs of the joint member 1074 may be threaded to threadably engage an aperture in the housing of the drill, or may include internally threaded holes that may be engaged with threaded fasteners to secure the joint member 1074 to the housing of the drill.

A bearing ring 1100 and bearing washer 1102 can be disposed between the impacting ring 1072 and collar 1042 of the spindle 1020.

The cover housing 1030 can include a bottom cover shell 1110 and a top cover shell 1112. The bottom cover shell 1110 can be generally container shaped, having a through opening for receiving the spindle 1020 and the joint member 1074 therethrough. The opening in bottom cover shell 1110 for receiving the spindle 1020 and the joint member 1074 can be "keyed" to the joint member 1074 to fix the joint member 1074, the bottom cover shell 1110 and the housing of the drill to one another and to inhibit relative rotation between the joint member 1074 and the bottom cover shell 1110. The bottom cover shell 1110 can include a plurality of grooves 1120 into which the guide members 1082 of the impacting ring 1072 can be received. Construction in this manner permits the impacting ring 1072 to move axially but not rotatably relative to the bottom cover shell 1110.

The top cover shell 1112 can also be generally container shaped, having a through hole for receiving the spindle 1020 therethrough. The top cover shell 1112 can define a flange 1122, which can abut the socket cover 1026 on a first side and the sleeve 1032 on an opposite side. The rear edge 1126, of the top cover shell 1112 can define a plurality of shallow and deep locking recesses 1132 and 1134, respectively, that are configured to receive the projections 1086 of the guide members 1082.

The sleeve 1032 can have a positioning member 1140 and a stop flange 1144. The positioning member 1140 can have a cylindrical through-hole and a plurality of positioning ridges 1146 that extend radially inwardly so as to engage the forward section 1040 of the spindle 1020. A bearing ring 1148 and bearing washer 1150 can be disposed between the stop flange 1144 and the flange 1122 on the top cover shell 1112.

When a drill bit 1160 is to be chucked in the drill chuck 1000, the top cover shell 1112 of the housing 1030 is rotated to align the projections 1086 on guide members 1082 with the deep locking recesses 1134 in the top cover shell 1112 so that the spring 1070 may urge the impacting ring 1072 forwardly so that the ring teeth 1092 engage the socket teeth 1060 to thereby resist relative rotation between the impacting ring 1072 and the threaded socket 1024. Subsequent rotation of the spindle 1020 in a first rotational direction causes relative rotation between the spindle 1020 and the threaded socket 1024 which drives the jaw members 1022 toward the rotational axis of the spindle 1020 and tightens the jaw members 1022 against the shank 1162 of the drill bit 1160. When a predetermined amount of torque is thereafter applied to the spindle 1020, the threaded socket 1024 will begin to rotate with the spindle 1020, causing the socket teeth 1060 to ride over the ring teeth 1092 and urge the impacting ring 1072 in a rearward direction away from the threaded socket 1024.

Since the spring 1070 biases the impacting ring 1072 forwardly, the socket teeth 1060 will periodically strike the ring teeth 1092 as the threaded socket 1024 rotates. The impact of the socket teeth 1060 and the ring teeth 1092 will generate a torque that is applied to the threaded socket 1024 and tends to further tighten the threaded socket 1024 against the jaw members 1022.

When the chuck 1000 is to be used in a drilling or driving operation, the top cover shell 1112 of the housing 1030 is rotated to align the projections 1086 on the guide members 1082 with the shallow locking recesses 1132 that are associated with the top cover shell 1112 so that the set of ring teeth 1092 are disengaged from the socket teeth 1060. Accordingly, rotation of the threaded socket 1024 is not inhibited by the teeth 1092 so that the socket 1024, jaws 1022 and spindle 1020 will co-rotate.

When the drill bit 1160 is to be removed from the chuck 1000, the top cover shell 1112 of the housing 1030 is rotated to align the projections 1086 on guide members 1082 with the deep locking recesses 1134 that are associated with the top cover shell 1112 so that the spring 1070 may urge the set of ring teeth 1092 that are formed on the impacting ring 1072 forwardly into alignment with socket teeth 1060 that are formed on the socket 1024 to thereby resist relative rotation between the impacting ring 1072 and the threaded socket 1024. Subsequent rotation of the spindle 1020 in a second rotational direction opposite the first rotational direction causes the spindle 1020 and the threaded socket 1024 to co-rotate such that the socket teeth 1060 periodically strike the ring teeth 1092. Contact between the socket teeth 1060 and the ring teeth 1092 generates torque that is applied to the threaded socket 1024 in a manner that tends to cause the jaw members 1022 to loosen from the drill bit 1160.

While such drill chucks have been shown to adequately hold drill bits and tool bits, difficulties have been noted with the aforementioned arrangements when such drill bits and tool bits are to be removed from the drill chuck. Specifically, the "loosening torque" that is generated is dependent upon a number of diverse variables, including the rotational speed of the spindle and differences between static and dynamic coefficients of friction.

In some situations, the variables that dictate the amount of torque that will be generated can change significantly between the time at which the drill bit is tightened in the chuck and the time at which the user desires to loosen the drill bit from the chuck. For example, the rotational speed of the spindle 1020 may be relatively lower when the drill bit is to be removed from the drill chuck 1000, as for example where the transmission of the drill or drill/driver has been shifted into a lower speed ratio or in the case of a battery operated tool, the battery has discharged to a point where it a relatively lower voltage input to the motor of the drill or drill/driver. In such cases, the operator may need to change the speed ratio of the drill or drill/driver into a higher speed ratio and/or replace or recharge the battery to remove the drill bit, which can be rather inconvenient.

The difference between static and dynamic coefficients of friction, however, tends to be somewhat more problematic. As is known, the dynamic coefficient of friction for a given material combination tends to be lower than the static coefficient of friction for that material combination. Since the amount of energy that is available to rotate the threaded socket 1024 is related to the amount of energy that is dissipated between threaded socket 1024 and the jaws members 1022 in the form of friction, lower friction losses between the threaded socket 1024 and the jaws members 1022 will result in more applied power to the threaded socket 1024.

Unfortunately, the coefficient of friction between the threaded socket 1024 and the jaw members 1022 is lowest when the threaded socket 1024 is already moving relative to the jaw members 1022 (i.e., when the threaded socket 1024 is rotating and the jaw members 1022 are being driven against the drill bit 1160) and highest when the threaded socket 1024 is stationary relative to the jaw members 1022 (i.e., when the jaw members 1022 are against the drill bit 1160 and the operator is attempting to rotate the threaded socket 1024 relative to the jaw members 1022). Where the difference between static and dynamic coefficients of friction is significant, drill chucks of the type that are disclosed in U.S. Pat. Nos. 6,247,706 and 6,729,812 may not release the drill bit from the chuck without the operator's use of tools, such as wrenches and lock-out tools, that permit the operator to manually release the drill bit from the drill chuck. In that regard, the recessed holes 1058 may be employed to manually loosen the jaw members 1022 in situations where the force generated by the impacting of the socket teeth 1060 against the ring teeth 1092 is insufficient to loosen the threaded socket 1024 from the jaw members 1022. Manual loosening of the threaded socket 1024 from the jaw members 1022 is described in detail in the U.S. Patents that were incorporated by reference, above, and as such, this operation need not be discussed in significant detail herein. As those of ordinary skill in the art, will appreciate that the manual release of a drill bit from a drill chuck is inconvenient.

SUMMARY

In one form, the present teachings provide a drill chuck with a spindle that is adapted to be coupled to a source of rotational power, a plurality of jaw members, each being slidably supported on the spindle and having a threaded surface formed on an outer side thereof, a threaded socket, a spring that is disposed about the spindle, an impacting structure and a changeover member. The threaded socket is disposed about the spindle and threadably engaged with the jaw members. The threaded socket includes a plurality of first socket teeth and a plurality of second socket teeth that are configured differently than the first socket teeth. The impacting structure is non-rotatably disposed about the spindle and biased toward the threaded socket by the spring. The impacting structure includes a first set of ring teeth and a second set of ring teeth that are configured differently from the set of first ring teeth. The changeover member is disposed about the threaded socket the threaded socket and the threaded socket engages the impacting structure. The changeover member is rotate-able between a first position, wherein the first and second socket teeth are axially spaced apart from the first and second ring teeth, and a second position, wherein the first and second socket teeth are not axially spaced apart from the first and second ring teeth. The first socket teeth and the first ring teeth contact one another when the threaded socket is rotated in a first rotational direction relative to the impacting structure and the changeover member is disposed in the second position. The second socket teeth and the second ring teeth contact one another when the threaded socket is rotated in a direction opposite the first rotational direction relative to the impacting structure and the changeover member is disposed in the second position.

In another form, the teachings of the present invention provide a drill chuck with a spindle that is adapted to be coupled to a source of rotational power, a plurality of jaw members having a threaded surface formed on an outer side thereof that are slidably supported on the spindle, a threaded socket disposed about the spindle and threadably engaged with the jaw members, a spring that is disposed about the spindle, an impacting structure and a changeover member. The threaded socket includes a plurality of first teeth. The impacting structure, which is non-rotatably disposed about the spindle, has a plurality of second teeth and is biased toward the threaded socket by the spring. The changeover member is disposed about the threaded socket and engages the impacting structure. The changeover member can be rotated between a first position, wherein the first and second teeth are axially spaced apart from one another, and a second position, wherein the first and second teeth are not axially spaced apart from one another so that the first and second teeth contact one another when the threaded socket is rotated relative to the impacting structure. Each of the first and second teeth have a tightening side, which contact one another to apply a force to the threaded collar in a direction that tends to rotate the threaded collar so as to slide the jaws toward a rotatary axis of the spindle. Each of the first and second teeth also have a loosening side, which contact one another to apply a force to the threaded collar in a direction that tends to rotate the threaded collar so as to slide the jaws away from the rotary axis of the spindle. The tightening side and the loosening side of at least one of the first and second teeth are differently configured so that the impacting structure and the threaded collar cooperate to generate relatively more torque in a reversing direction.

In a further form, the teachings of the present invention provide a drill chuck with a spindle that is adapted to be coupled to a source of rotational power, a plurality of jaw members with a threaded surface formed on an outer side thereof that are slidably supported on the spindle, a threaded socket, a spring disposed about the spindle, an impacting structure, a changeover member and at least one resilient element. The threaded socket, which includes a plurality of first teeth, is disposed about the spindle and threadably engaged with the jaw members. The impacting structure, which has a plurality of second teeth, is disposed about the spindle and is biased toward the threaded socket by the spring. The changeover member is disposed about the threaded socket and engages the impacting structure. The changeover member can be rotated between a first position, wherein the first and second teeth are axially spaced apart from one another, and a second position, wherein the first and second teeth are not axially spaced apart from one another so that the first and second teeth contact one another when the threaded socket is rotated relative to the impacting structure. The resilient element is configured to absorb a portion of a force transmitted to the impacting structure when the first and second teeth contact one another only when the threaded collar is driven in a rotational direction that is associated with sliding of the jaws toward a rotatary axis of the spindle.

In yet another form, the present teachings provide a drill chuck including a spindle that is adapted to be coupled to a source of rotational power, a plurality of jaw members that have a threaded surface formed on an outer side thereof and which are slidably supported on the spindle, each jaw member, a threaded socket, a spring disposed about the spindle, a joint member, an impacting structure, a changeover member, a housing member and an adjusting collar. The threaded socket, which includes a plurality of first teeth, is disposed about the spindle and threadably engaged with the jaw members. The joint member is disposed about the spindle and abuts a first side of the spring. The impacting structure, which has a plurality of second teeth, is disposed about the spindle and biased toward the threaded socket by the spring. The changeover member is disposed about the threaded socket and engages the impacting structure. The changeover member can be rotated between a first position, wherein the first and second teeth are axially spaced apart from one another, and a second position, wherein the first and second teeth are not axially spaced apart from one another so that the first and second teeth contact one another when the threaded socket is rotated relative to the impacting structure. The impacting structure is disposed in the housing member. The housing member includes a plurality of axially extending grooves that limit rotation of the impacting structure while permitting the impacting structure to travel in an axial direction. The adjustment collar is coupled to the joint member and operable for selectively axially positioning the joint member relative to the housing member so as to adjust a force that is exerted onto the impacting structure by the spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
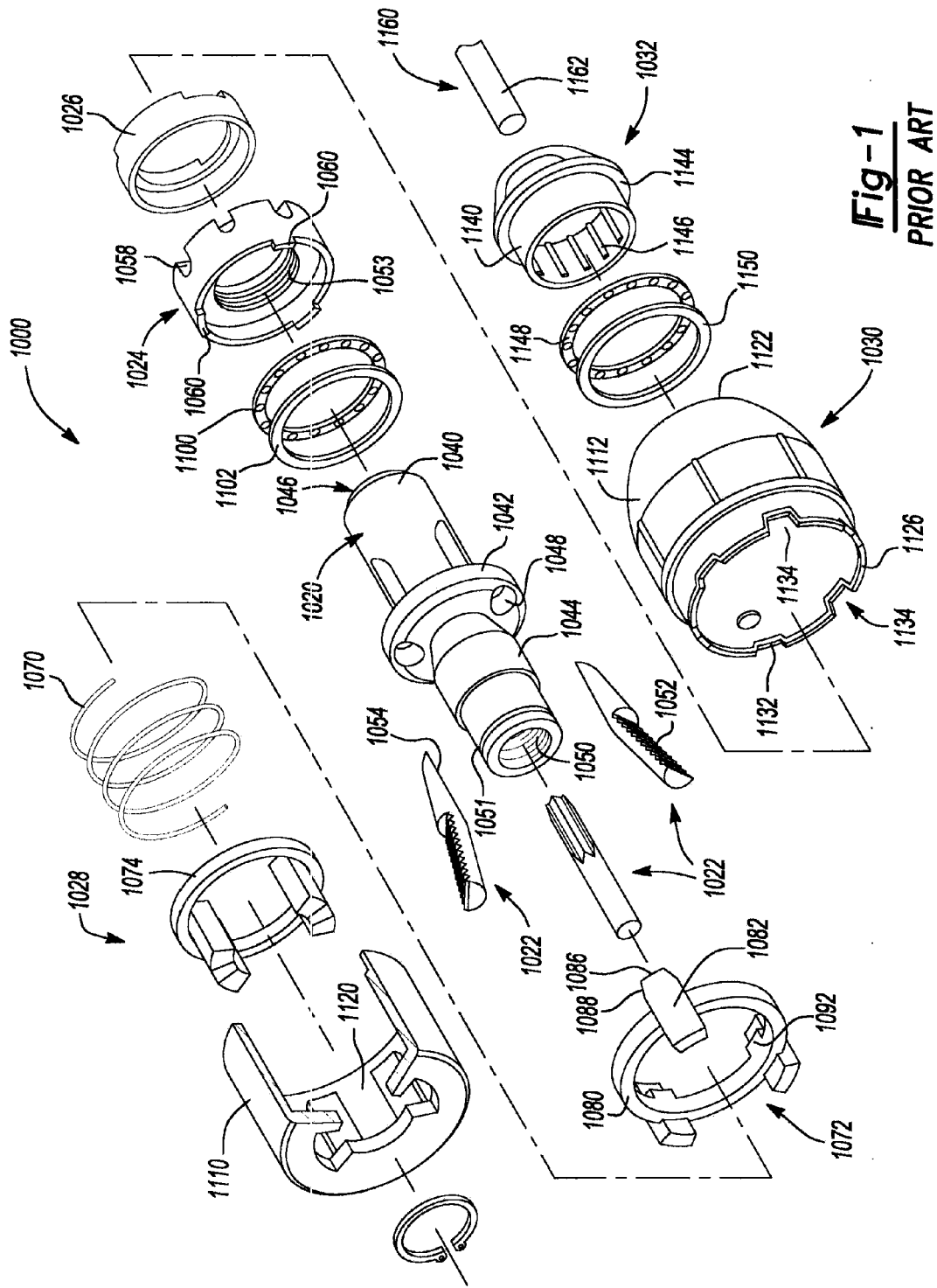
FIG. 1 is an exploded perspective view of a prior art impacting-type drill chuck.
Figure 2:
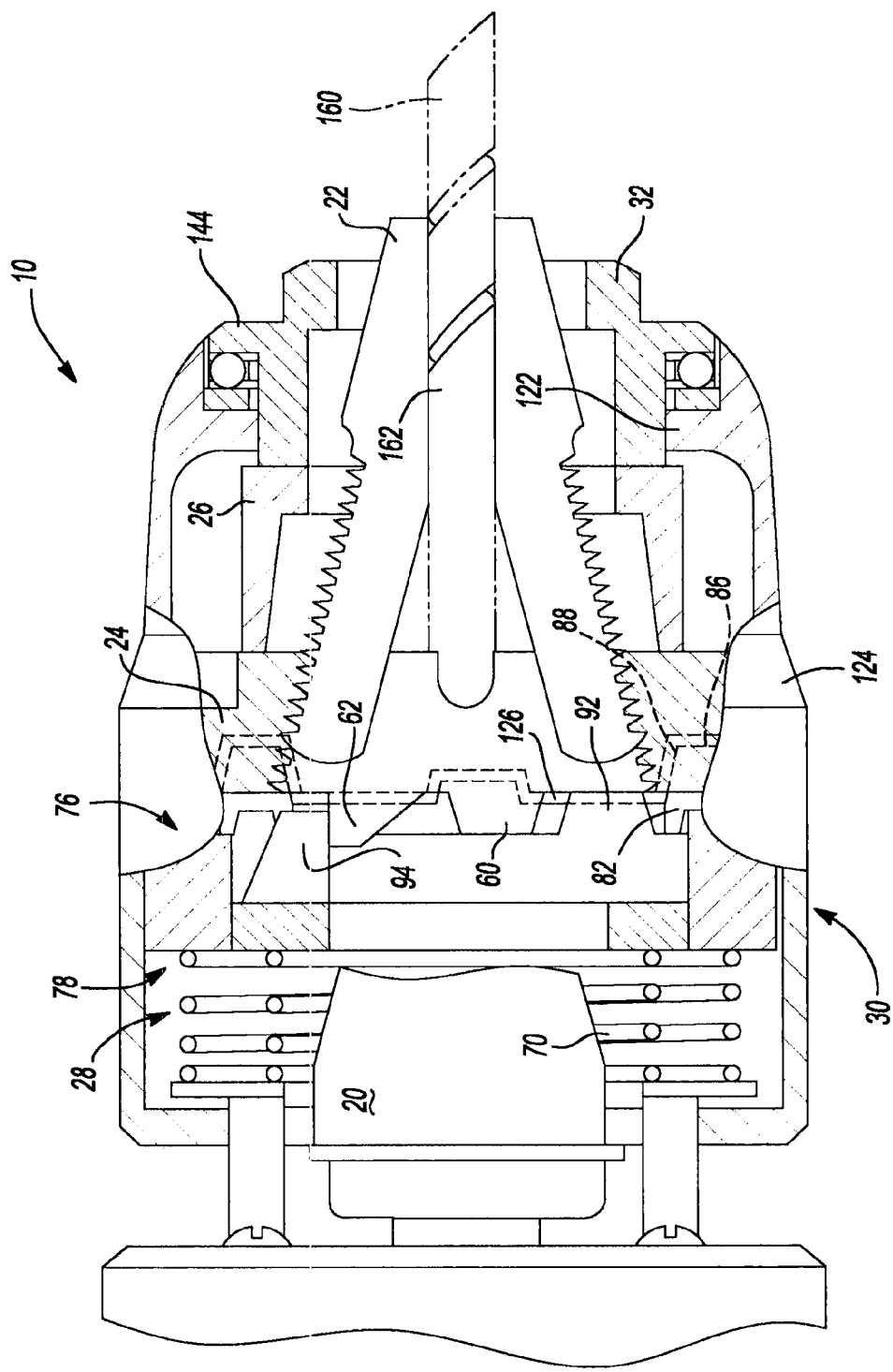
FIG. 2 is a sectional view of a portion of a drill chuck constructed in accordance with the teachings of the present invention.
Figure 3:
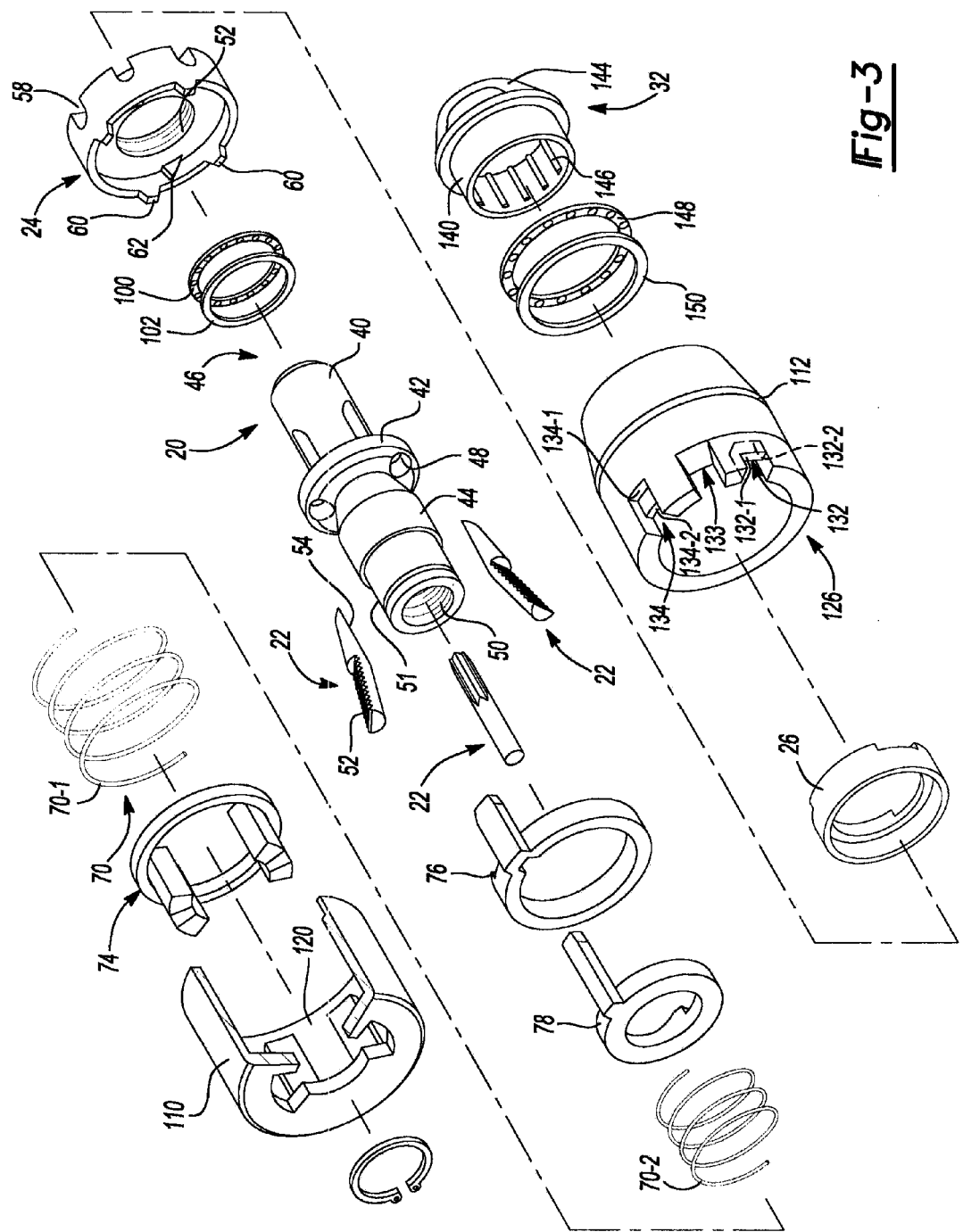
FIG. 3 is an exploded perspective view of the drill chuck of FIG. 2.
Figure 3A:
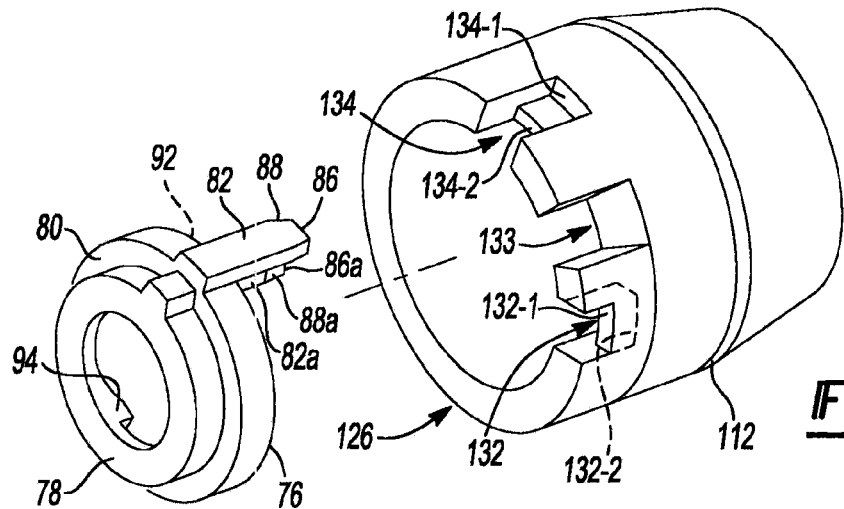
FIG. 3A is an exploded perspective view of a portion of the drill chuck of FIG. 1 illustrating the impacting ring and the top cover shell in a condition associated with the tightening of the chuck jaws.

With reference to FIGS. 2 and 3 of the drawings, a drill chuck constructed in accordance with the teachings of the present invention is generally indicated by reference numeral 10. Except as noted herein, the drill chuck 10 is generally similar to that which is described in U.S. Pat. No. 6,247,706. The drill chuck can include a spindle 20, a plurality of jaw members 22, a threaded socket 24, a socket cover 26, a thrust bearing assembly 28, a cover shell or housing 30, and a sleeve 32.

The spindle 20 can have a forward section 40, a collar 42 and a rearward section 44. The forward section 40 can have a center through hole 46 formed therein, while the collar 42 can have a plurality of angularly disposed guide channels 48 formed therethrough which intersect the center through hole 46. The rearward section 44 can have a threaded hole 50, which is adapted to threadingly engage an output spindle of a power tool (not shown), and a snap ring groove 51.

The jaw members 22 can be slidably positioned in the guide channels 48 and can each include a threaded surface 52, which is formed on an outer side, and a gripping surface 54, which is formed on a forward inner surface.

The threaded socket 24 can be disposed about the spindle 20 and can have an internally tapered and threaded surface 53 that is threadably coupled with the threaded surfaces 52 of the jaw members 22. A plurality of recessed holes 58, which may be employed to manually tighten or loosen the drill chuck 10 in a conventional and well known manner, can be formed about the exterior of the threaded socket 24, while a plurality of first socket teeth 60 and one or more second socket teeth 62 can be formed on the bottom surface of the threaded socket 24. The first and second socket teeth 60 and 62 can be different from one another in their distance radially from the axis about which the spindle 20 rotates, their overall quantity, their shape and/or overall height. In the particular example provided, the quantity of first socket teeth 60 is double that of the second socket teeth 62 and the height of the second socket teeth 62 is approximately 1.25 to 1.5 times that of the height of the first socket teeth 60.

The socket cover 26 can be mounted about the forward section 40 of the spindle 20 and can contact the threaded socket 24 on a side opposite the first and second socket teeth 60 and 62.

The thrust bearing assembly 28 can include a spring assembly 70, an impacting structure 72, which can be formed as a ring, and a joint member 74. The impacting ring 72 can be disposed about the spindle and can include a first ring portion 76 and a second ring portion 78.

The first ring portion 76 can include an annular body 80, one or more axially-extending guide members 82 that can be coupled to the annular body 80, and a plurality of first ring teeth 92 on a forward side. In the particular example provided, the guide member 82 can include a tooth-like projection 86 having tapered sides 88. The annular body 80 can define a bore 80-1 is sized to receive the second ring portion 78. The second ring portion 78 can include an annular body 78-1, one or more axially-extending guide members 82a that can be coupled to the annular body 78-1, and a plurality of second ring teeth 94 on a forward side. In the example provided, the guide member 82a extends radially outwardly from the annular body 78-1 and cooperates with the bore 80-1 so as to permit relative axial movement between the first and second ring portions 76 and 78 while inhibiting relative rotation therebetween.

The first and second ring teeth 92 and 94 are configured so as to be capable of engaging the first and second socket teeth 60 and 62, respectively, as will be described in detail, below. Like the first and second socket teeth 60 and 62, the first and second ring teeth 92 and 94 can be different from one another in their distance radially from the axis about which the spindle 20 rotates, their overall quantity, their shape and/or overall height. In the particular example provided, the quantity of first ring teeth 92 is double that of the second ring teeth 94 and the height of the second ring teeth 94 is approximately 1.25 to 1.5 times that of the height of the first ring teeth 92.

The spring assembly 70 can include an outer spring 70-1 and an inner spring 70-2. The outer and inner springs 70-1 and 70-2 can be disposed about the spindle 20 and can abut joint member 74 on the rearward side. The forward side of the outer spring 70-1 can abut the rearward side of the first ring portion 76, while the forward side of the inner spring 70-2 can abut the rearward side of the second ring portion 78. The outer and inner springs 70-1 and 70-2 are operable for biasing the first and second ring portions 76 and 78, respectively, toward the threaded socket 24.

A bearing ring 100 and bearing washer 102 can be disposed between the impacting ring 72 and collar 42 of the spindle 20.

The cover housing 30 can include a bottom cover shell 110 and a changeover member 112, which can be formed as a top cover shell. The bottom cover shell 110 can be generally container shaped, having a through opening for receiving the spindle 20 and the joint member 74 therethrough. The opening in bottom cover shell 110 for receiving the spindle 20 and the joint member 74 can be "keyed" to the joint member 74 to fix the joint member 74, the bottom cover shell 110 and the housing of the drill to one another and to inhibit relative rotation between the joint member 74 and the bottom cover shell 110. The bottom cover shell 110 can include a plurality of grooves 120 into which the guide members 82 of the impacting ring 72 can be received. Construction in this manner permits the impacting ring 72 to move axially but not rotatably relative to the bottom cover shell 110. The bottom cover shell 110 can include a plurality of grooves 120 into which the guide members 82 of the first ring portion 76 of the impacting ring 72 can be received. Construction in this manner permits the impacting ring 72 to move axially but not rotatably relative to the bottom cover shell 110.

The top cover shell 112 can also be generally container shaped, having a through hole for receiving the spindle 20 therethrough. The top cover shell 112 can define a flange 122, which can abut the socket cover 26, a flange stop 144, which is configured to abut the top face of the bottom cover shell 110, and a rear edge 126, which can define first, second and third locking recesses 132, 133 and 134, respectively, that are configured to receive the projections 86 and 86a of the guide members 82 and 82a. The first locking recess 132 can be stepped and can have a relatively shallow outer portion 132-1 and a relatively deeper inner portion 132-2. The second locking recess 133 can be uniformly shaped and can have a depth that is approximately equal to that of the outer portion 132-1 of the first locking recess 132. The third locking recess 134 can be stepped and can have a relatively deep outer portion 134-1 and a relatively shallower inner portion 134-2. The outer portion 134-1 can have a depth that is approximately equal to a depth of the inner portion 132-2, while the inner portion 134-2 can have a depth that is approximately equal to a depth of the outer portion 132-2. Those of ordinary skill in the art will appreciate that the top cover shell 112 can be unitarily formed of a given material, or may be formed of two or more components so as to provide various areas, such as the locking recesses 132, 133 and 134, with improved strength and/or wear resistance.

The sleeve 32 can have a positioning member 140 and a stop flange 144. The positioning member 140 can have a cylindrical through-hole and a plurality of positioning ridges 146 that extend radially inwardly so as to engage the forward section 40 of the spindle 20. A bearing ring 148 and bearing washer 150 can be disposed between the stop flange 144 and the flange 122 on the top cover shell 112.

Figure 4:
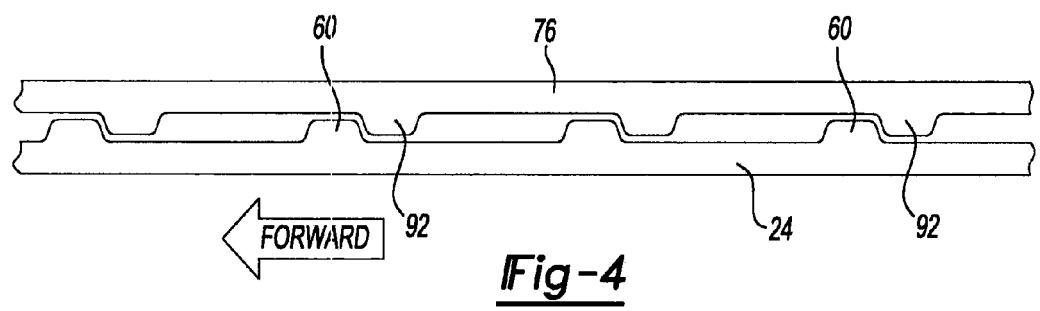
FIG. 4 is a partial sectional view of the drill chuck of FIG. 2 taken through the first socket teeth and the first ring teeth.
Figure 5:
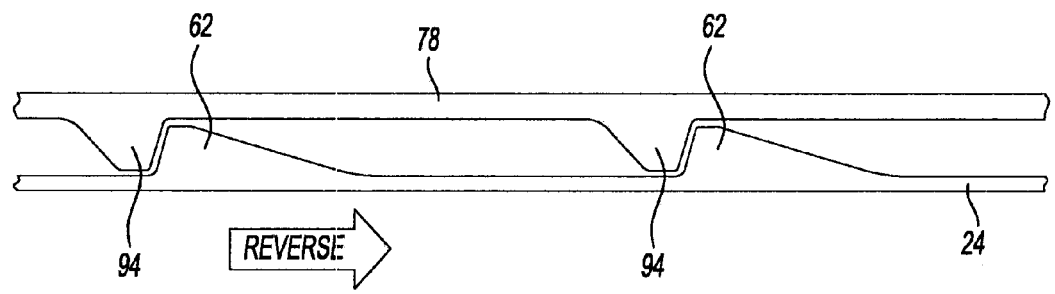
FIG. 5 is a partial sectional view of the drill chuck of FIG. 2 taken through the second socket teeth and the second ring teeth.

A drill bit 160 can be inserted in the center through hole 46. The top cover shell 112 can be rotated to align the projections 86 and 86a of the guide members 82 and 82a with the third locking recess 134. The outer portion 134-1, being relatively deep, permits the spring 70-1 to urge the first portion 76 of the impacting ring 72 forwardly to permit the first ring teeth 92 to engage the first socket teeth 60, as shown in FIG. 4, while the inner portion 134-2, being relatively shallow, maintains the second portion 78 of the impacting ring 72 in spaced apart relation with the threaded socket 24 so that the second ring teeth 94 are disengaged from the second socket teeth 62. In this condition, the first ring teeth 92 and the first socket teeth 60 engage one another to resist relative rotation between the first ring portion 76 and the threaded socket 24. Subsequent rotation of the spindle 20 in a first rotational (i.e., tightening) direction causes relative rotation of the threaded socket 24 to drive the jaw members 22 toward the rotational axis of the spindle 20, which tightens the jaw members 22 against the shank 162 of the drill bit 160.

Slippage can occur between the first ring teeth 92 and the first socket teeth 60 when the spindle 20 is driven in the first rotational direction after the jaw members 22 have been tightened against the shank 162 of the drill bit 160. More specifically, the spindle 20 and the threaded socket 24 will tend to co-rotate such that the first socket teeth 60 will ride over the first ring teeth 92 and urge the first portion 76 of the impacting ring 72 in a rearward direction away from the threaded socket 24. Since the spring 70-1 biases the first portion 76 of the impacting ring 72 forwardly, the first socket teeth 60 will periodically strike the first ring teeth 92 as the threaded socket 24 rotates and the first portion 76 is urged forwardly by the spring 70-1. The impact of the first socket teeth 60 and the first ring teeth 92 will generate a force that is applied to the threaded socket 24 that tends to further tighten the threaded socket 24 against the jaw members 22.

Figure 3B:
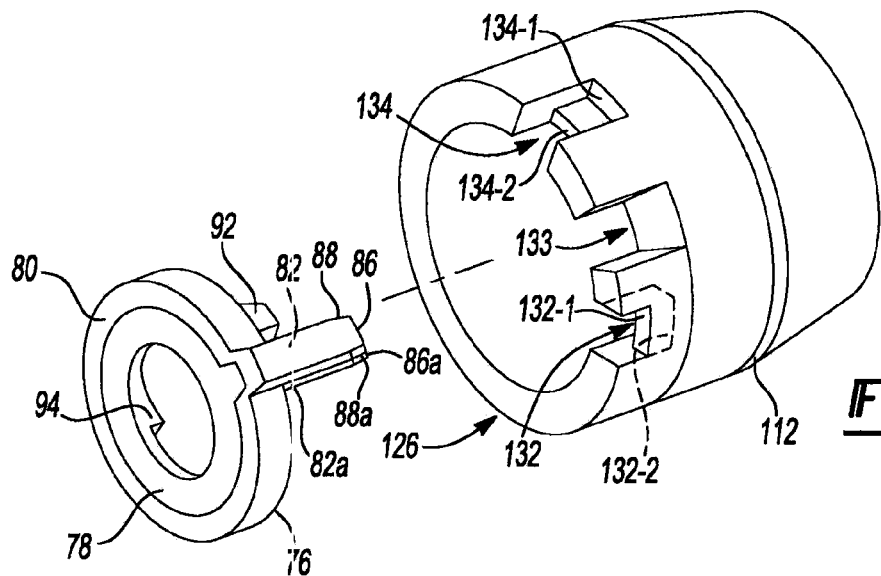
FIG. 3B is a view similar to that of FIG. 3A but illustrating the impacting ring and the top cover shell in a condition associated with drilling or driving.
Figure 3C:
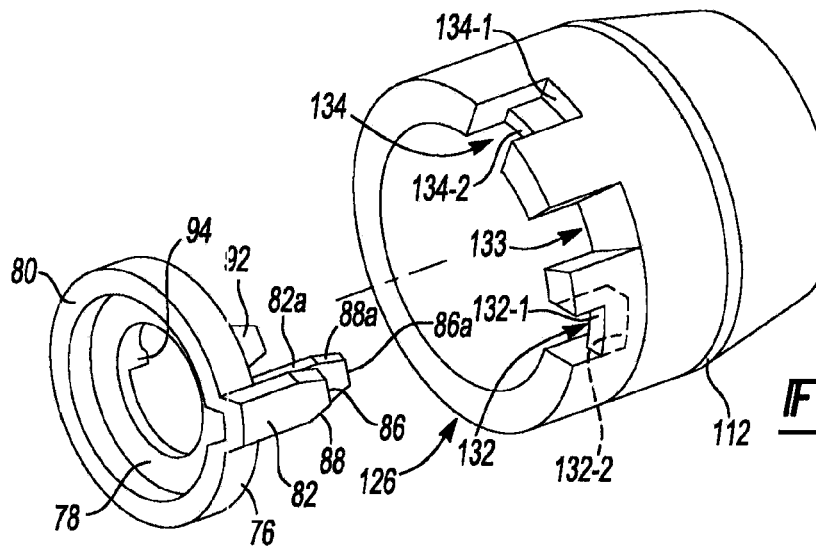
FIG. 3C is a view similar to that of FIG. 3A but illustrating the impacting ring and the top cover shell in a condition associated with the loosening of the chuck jaws.

With reference to FIGS. 2, 3 and 3B, when the drill chuck 10 is to be employed in a drilling or driving operation, the top cover shell 112 is rotated to align the projections 86 and 86a of the guide members 82 and 82a with the second locking recess 133. The second locking recess 133, being relatively shallow, maintains the first and second ring portions 76 and 78 of the impacting ring 72 in spaced apart relation with the threaded socket 24 so that the first and second ring teeth 92 and 94 are disengaged from the first and second socket teeth 60 and 62. Accordingly, the threaded socket 24 may co-rotate with the spindle 20 unimpeded by the impacting ring 72.

With reference to FIGS. 2, 3, 3C and 5, if removal of the drill bit 160 is desired, the top cover shell 112 is rotated to align the projections 86 and 86a of the guide members 82 and 82a with the first locking recesses 132. The outer portion 132-1, being relatively shallow, maintains the first portion 76 of the impacting ring 72 in a spaced apart relation with the threaded socket 24 so that the first ring teeth 92 are disengaged from the first socket teeth 60, while inner portion 132-2, being relatively deep, permits the spring 70-2 to urge the second portion 78 of the impacting ring 72 forwardly to permit the second ring teeth 94 to engage the second socket teeth 62.

In this condition, the second ring teeth 94 and the second socket teeth 66 engage one another to resist relative rotation between the second ring portion 78 and the threaded socket 24. Subsequent rotation of the spindle 20 in a second rotational (i.e., loosening) direction opposite the first rotational direction causes the threaded socket 24 to rotate relative to the impacting ring 72 such that the second socket teeth 62 will periodically strike the second ring teeth 94. If the impact between the second socket teeth 62 and the second ring teeth 94 is insufficient to loosen the threaded socket 24 from the jaw members 22, then in a manner that is similar to that which was explained for the tightening mode, the second socket teeth 62 will skip over the second ring teeth 94 and urge the second portion 78 of the impacting ring 72 rearwardly. The spring 70-2 will bias the second portion 78 of the impacting ring 72 forwardly so that on further rotation of the spindle 20 and the threaded socket 24, the second socket teeth 62 will periodically strike the second ring teeth 94. The impact of the second socket teeth 62 against the second ring teeth 94 will generate a force that is applied to the threaded socket 24 that tends to loosen the threaded socket 24 from the jaw members 22 (i.e., drive the jaw members 22 away from the drill bit 160). Accordingly, the threaded socket 24 can be loosened from the jaw members 22, regardless of the speed at which the threaded socket 24 was tightened or loosened.

In view of the discussion above, those of ordinary skill in the art will appreciate that the first and second socket teeth 60 and 62 (and/or the first and second ring teeth 92 and 94) may be different in an amount by which they are radially spaced apart from a rotational axis of the threaded socket 24; may be formed differently in shape; may be formed differently in height; and/or that the quantity of one of the sets of teeth may be different than the other set of teeth.

Those of ordinary skill in the art will also appreciate that the spring assembly may include a single coil spring, such as that which is illustrated in FIGS. 13 through 16. In this example, the spring assembly 70-a can include a single coil spring 70-a1, a spring plate 70-b and a plurality of distributors 70-c that can include a bracket 70-c1 and a pivot 70-c2. The spring plate 70-b can be an annular plate-like member that can have a plurality of slots 70-b1 formed therein that can be configured to receive an associated one of the brackets 70-c1.

Figure 14:
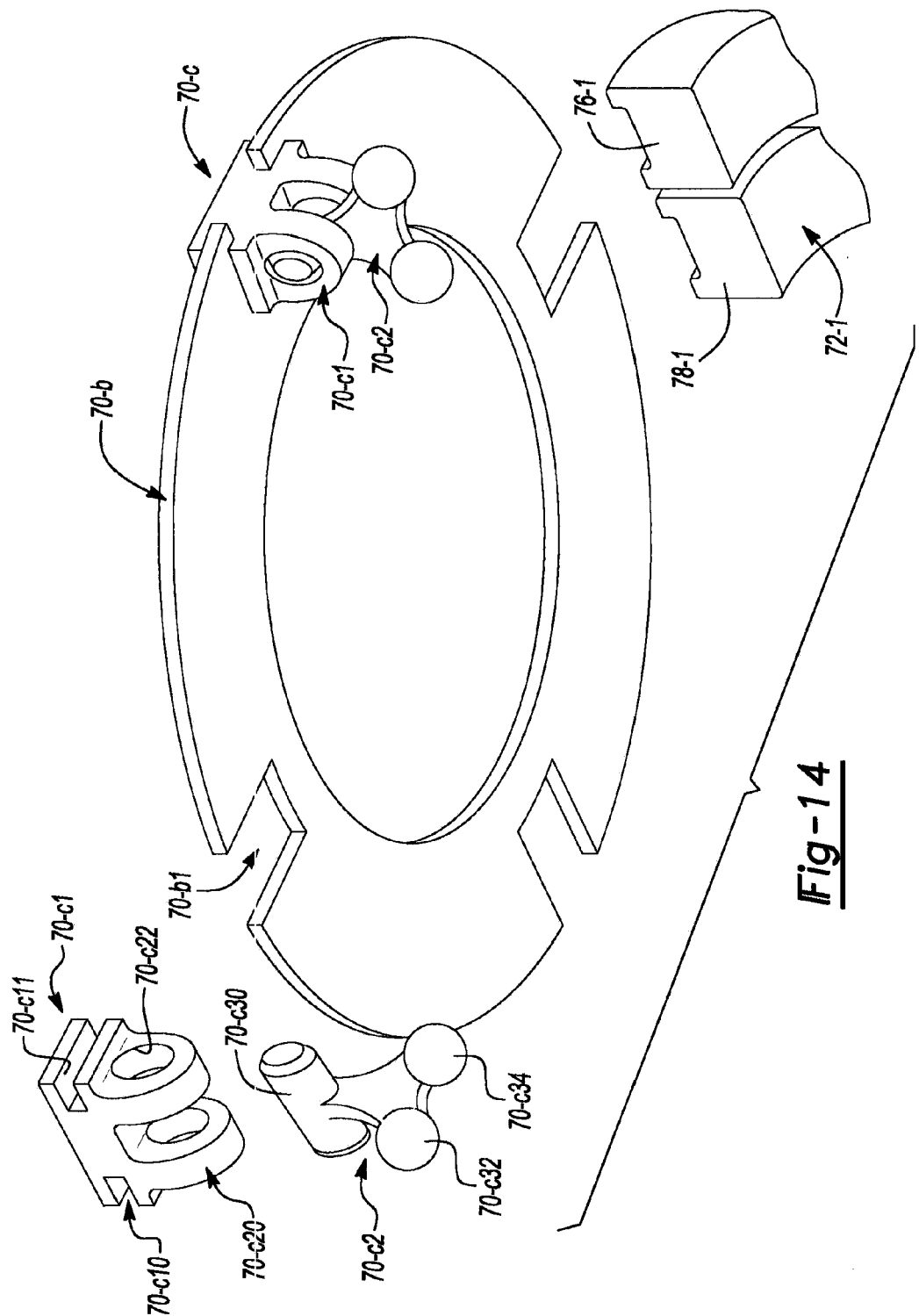
FIG. 14 is an exploded perspective view of a portion of the drill chuck illustrated in FIG. 13.

The brackets 70-c1 can include U-shaped or channel-like recesses 70-c10 on its opposite lateral sides. The opening 70-c11 defined by each channel-like 70-c10 can be sized to receive the spring plate 70-b such that the bracket 70-c1 can be slidingly engaged to the spring plate 70-b as shown in FIG. 14. The bracket 70-c1 can also include a yoke 70-c20 having a pivot aperture 70-c22 formed therein.

Each pivot 70-c2 can include a pivot pin 70-c30 and a first and second pivot contact surfaces 70-c32 and 70-c34, respectively. The pivot pin 70-c30 can be received into the pivot aperture 70-c22 so as to be pivotally coupled to the bracket 70-c1. Pivoting can be controlled by any appropriate mechanism or system, such as through pairs or sets of tabs 112-1 and 112-1 that can be formed on an inner surface of the top cover shell (not specifically shown).

Figure 15:
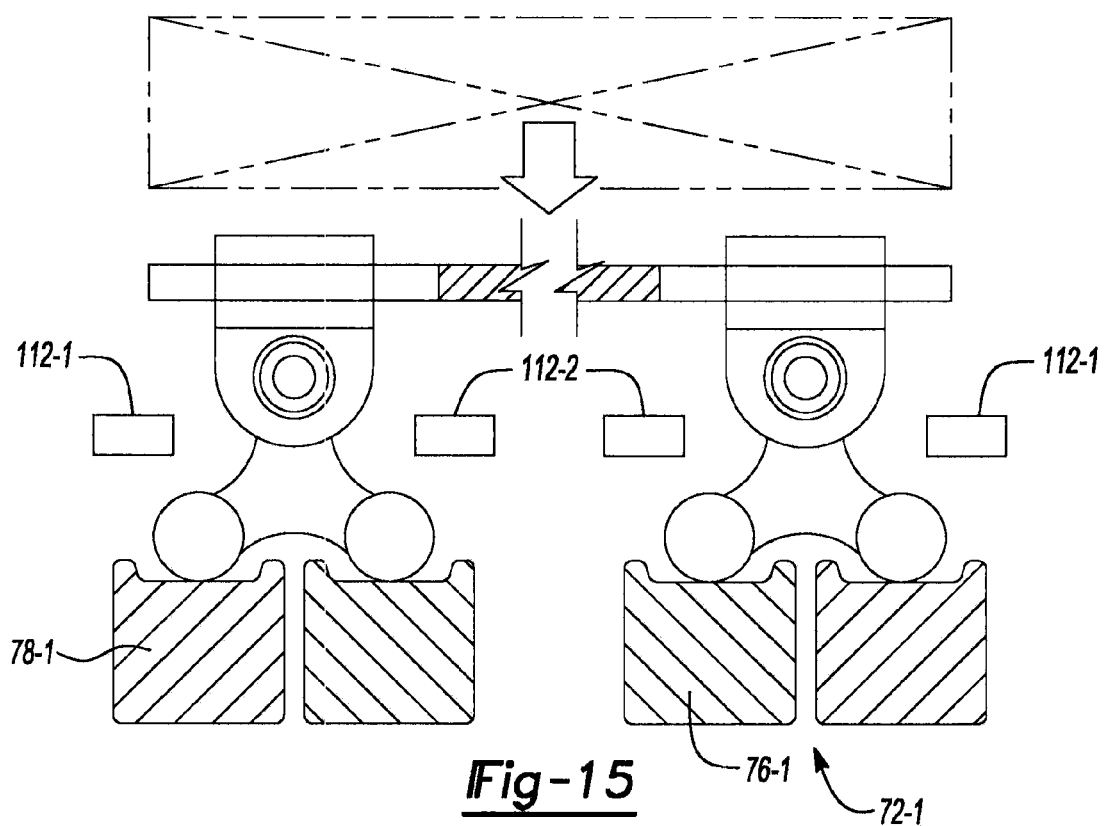
FIG. 15 is a view similar to that of FIG. 13 but illustrating the drill chuck in a drilling mode.

With specific reference to FIGS. 14 and 15, when the drill chuck is to be operated in a drilling mode, the top cover shell (not specifically shown) can be indexed into a position where pairs of tabs 112-1 and 112-2 urge the pivots 70-c2 into a neutral position where they contact the first and second portions 76-1 and 78-1 of the impacting ring 78-1 in a manner that distributes the force of the spring 70-a1 (FIG. 13) equally. In this condition, forward movement of the first and second portions 76-1 and 78-1 of the impacting ring 78-1 is checked by the top cover shell in a manner that is similar to that which is described above to thereby inhibit the first and second ring teeth (not shown) from contacting the first and second socket teeth (not shown).

Figure 16:
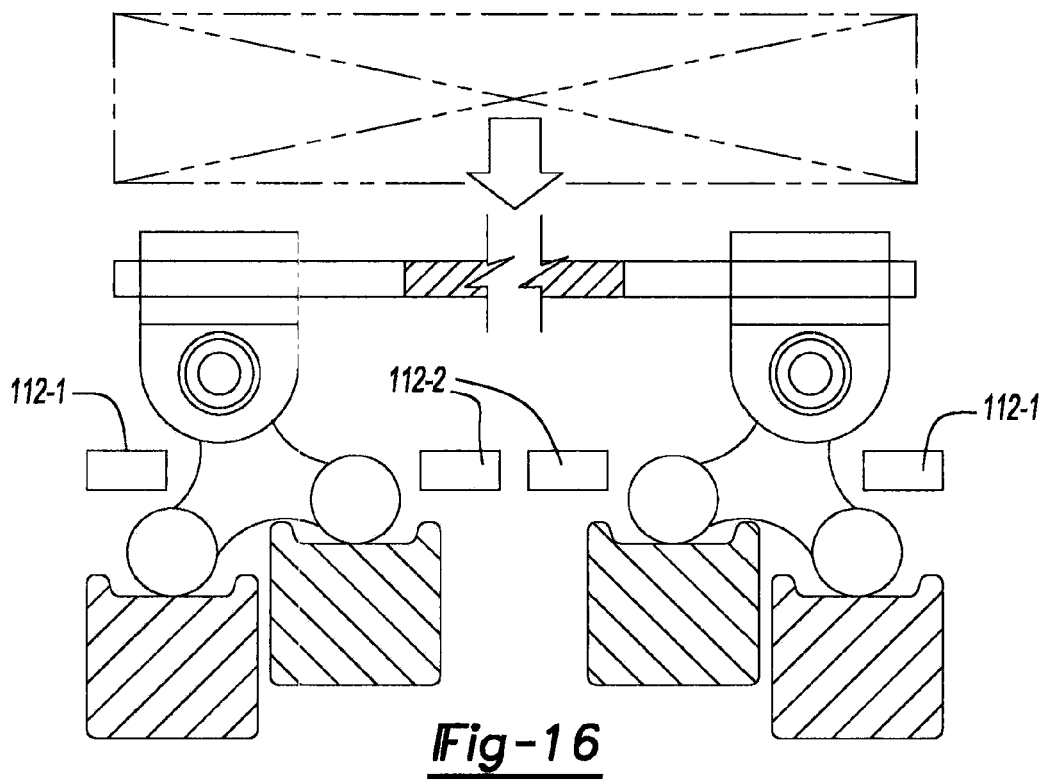
FIG. 16 is a view similar to that of FIG. 13 but illustrating the drill chuck in a tightening mode.

With reference to FIGS. 14 and 16, if a drill bit (not shown) is to be installed into the drill chuck, the top cover shell (not specifically shown) can be indexed into a position where the tabs 112-1 urge the pivots 70-c2 into a first pivoted position where they are pivoted about the pivot pin 70-c30 so as to urge the first portion 76-1 of the impacting ring 72-1 forwardly, while the second ring portion 78-1 may remain in the neutral position or somewhat rearward thereof. In this condition, the top cover shell permits forward movement of the first ring portion 76-1 while inhibiting forward movement of the second ring portion 78-1 in a manner that is similar to that which is described in detail in conjunction with the embodiment of FIGS. 2 through 5. Accordingly, the first ring teeth and the first socket teeth engage one another, while the second ring teeth and the second socket teeth are spaced apart from one another.

Figure 13:
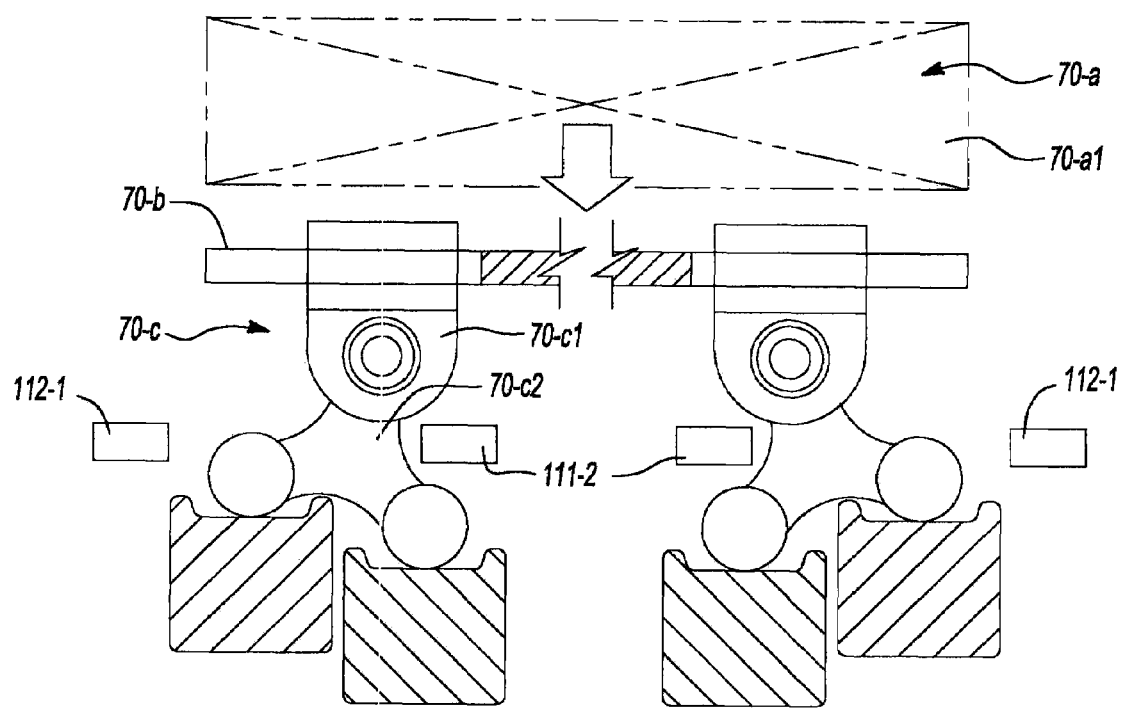
FIG. 13 is a schematic elevation view of another drill chuck constructed in accordance with the teachings of the present invention.

With reference to FIGS. 13 and 14, if a drill bit (not shown) is to be removed from the drill chuck, the top cover shell (not specifically shown) can be indexed into another position where the tabs 112-2 urge the pivots 70-c2 into a second pivoted position where they are pivoted about the pivot pin 70-c30 so as to urge the second portion 78-1 of the impacting ring 72-1 forwardly, while the first ring portion 76-1 may remain in the neutral position or somewhat rearward thereof. In this condition, the top cover shell permits forward movement of the second portion 78-1 while inhibiting forward movement of the first portion 76-1 in a manner that is similar to that which is described in detail in conjunction with the embodiment of FIGS. 2 through 5. Accordingly, the second ring teeth and the second socket teeth engage one another, while the first ring teeth and the first socket teeth are spaced apart from one another.

Figure 17:
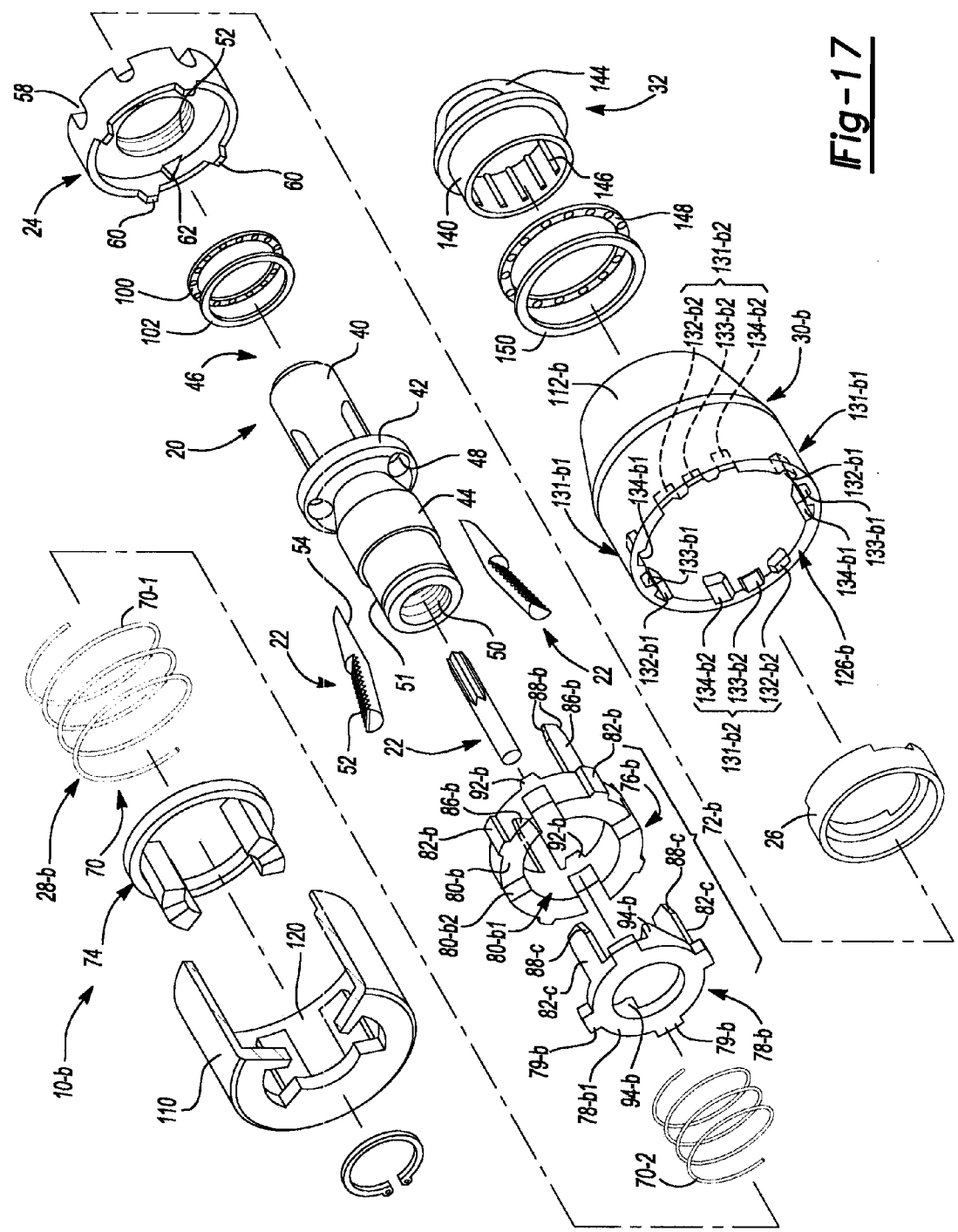
FIG. 17 is a view similar to that of FIG. 3 but illustrating yet another drill chuck constructed in accordance with the teachings of the present invention.

Another dual-spring arrangement is illustrated in FIG. 17. In this example, the drill chuck 10-b can include a spindle 20, a plurality of jaw members 22, a threaded socket 24, a socket cover 26, a thrust bearing assembly 28-b, a cover shell or housing 30-b, and a sleeve 32. The spindle 20, jaw members 22, threaded socket 24, socket cover 26 and sleeve 32 can be substantially identical to those which were described above in conjunction with the example of FIGS. 2 through 5 and as such, a discussion of these components need not be provided.

The thrust bearing assembly 28-b can include a spring assembly 70, an impacting ring 72-b and a joint member 74. The impacting ring 72-b can be disposed about the spindle 20 and can include a first ring portion 76-b and a second ring portion 78-b.

The first ring portion 76-b can include an annular body 80-b, one or more axially-extending guide members 82-b that can be coupled to and extend radially from the annular body 80-b, one or more projections 86-b that can extend forwardly from the annular body 80-b and a plurality of first ring teeth 92-b on a forward side of the annular body 80-b. The projections 86-b can be generally tooth-shaped and have tapered sides 88-b. The annular body 80-b can define a bore 80-b1 is sized to receive the second ring portion 78-b. A plurality of guide apertures 80-b2 can be formed into the body 80-b. In the particular example provided, four guide apertures 80-b2 are evenly spaced apart about the circumference of the body 80-b, but those of ordinary skill in the art will readily appreciate from this disclosure that the number and spacing of the guide apertures 80-b2 may be different from that which is illustrated.

The second ring portion 78-b can include an annular body 78-b1, one or more axially-extending guide members or projections 82-c that can be coupled to the annular body 78-b1, a plurality of guide tabs 79-b, and a plurality of second ring teeth 94-b on a forward side of the annular body 78-b1. In the example provided, the guide tabs 79-b extend radially outwardly from the annular body 78-1 and are received into the guide apertures 80-b2 so as to permit relative axial movement between the first and second ring portions 76-b and 78-b while inhibiting relative rotation therebetween. The guide members or projections 82-c, like the projections 86-b, can be generally tooth-like and can include tapered sides 88-c The first and second ring teeth 92-b and 94-b are configured so as to be capable of engaging the first and second socket teeth 60 and 62, respectively, as will be described in detail, below. Like the first and second socket teeth 60 and 62, the first and second ring teeth 92-b and 94-b can be different from one another in their distance radially from the axis about which the spindle 20 rotates, their overall quantity, their shape and/or overall height. In the particular example provided, the quantity of first ring teeth 92-b is double that of the second ring teeth 94-b and the height of the second ring teeth 94-b is approximately 1.25 to 1.5 times that of the height of the first ring teeth 92-b. In the particular example provided, the projections 88-b and the projections or guide members 82-c are staggered when the first and second portions 76-b and 78-b are non-rotatably engaged to one another, but as those of ordinary skill in the art will appreciate, the positioning of the projections 88-b and the guide members 82-c may be changed as desired.

The spring assembly 70 can include an outer spring 70-1 and an inner spring 70-2. The outer and inner springs 70-1 and 70-2 can be disposed about the spindle 20 and can abut joint member 74 on the rearward side. The forward side of the outer spring 70-1 can abut the rearward side of the first ring portion 76-b, while the forward side of the inner spring 70-2 can abut the rearward side of the second ring portion 78-b. The outer and inner springs 70-1 and 70-2 are operable for biasing the first and second ring portions 76-b and 78-b, respectively, toward the threaded socket 24.

The cover housing 30-b can include a bottom cover shell 110 and a top cover shell 112-b. The bottom cover shell 110 can be generally container shaped, having a through opening for receiving the spindle 20 and the joint member 74 therethrough. The bottom cover shell 110 can include a plurality of grooves 120 into which the guide members 82-b of the first portion 76-b of the impacting ring 72-b can be received. Construction in this manner permits the impacting ring 72-b to move axially but not rotatably relative to the bottom cover shell 110.

The top cover shell 112-b can also be generally container shaped, having a through hole for receiving the spindle 20 therethrough. The top cover shell 112-b can be similar to the top cover shell 112 described above, except that the rear edge 126-b is illustrated to include sets of first recesses 131-b1 and sets of second recesses 131-b2. Each set of first recesses 131-*b*1 includes a first locking recess 132-*b*1, a second locking recess 133-*b*1 and a third locking recess 134-*b*1, while each set of first recesses 131-*b*2 includes a first locking recess 132-*b*2, a second locking recess 133-*b*2 and a third locking recess 134-*b*2. In the example provided, the second locking recess 133*b*-1, the third locking recess 134-*b*1, the first locking recess 132-*b*2 and the second locking recess 133*b*-2 are formed to an approximately equal first or shallow depth, while the first locking recess 132-*b*1 and the third locking recess 134-*b*2 are formed to an approximately equal second depth that is deeper than the first depth. Each of the locking recesses 132-*b*1, 133-*b*1 and 134-*b*1 is sized to receive the forward end of an associated projection 86-*b*, while the locking recesses 132-*b*2, 133-*b*2 and 134-*b*2 is sized to receive the forward end of an associated guide member 88-*c*. Those of ordinary skill in the art will appreciate that the top cover shell 112-*b* can be unitarily formed of a given material, or may be formed of two or more components so as to provide various areas, such as the locking recesses with improved strength and/or wear resistance.

A drill bit 160 can be inserted in the center through hole 46. The top cover shell 112-*b* can be rotated to align the projections 86-*b* with the first locking recesses 132-*b*1 and the guide members 82-*c* with the first locking recess 132-*b*2. Since the locking recesses 132-*b*1 are relatively deep, the spring 70-1 urges the first portion 76-*b* of the impacting ring 72-*b* forwardly to permit the first ring teeth 92-*b* to engage the first socket teeth 60 while the first locking recess 12-*b*2, being relatively shallow, maintains the second portion 78-*b* of the impacting ring 72-*b* in spaced apart relation with the threaded socket 24 so that the second ring teeth 94-*b* are disengaged from the second socket teeth 62. In this condition, the first ring teeth 92-*b* and the first socket teeth 60 engage one another to resist relative rotation between the first ring portion 76-*b* and the threaded socket 24. Subsequent rotation of the spindle 20 in a first rotational (i.e., tightening) direction causes relative rotation of the threaded socket 24 to drive the jaw members 22 toward the rotational axis of the spindle 20, which tightens the jaw members 22 against the shank 162 of the drill bit 160.

Slippage can occur between the first ring teeth 92-*b* and the first socket teeth 60 when the spindle 20 is driven in the first rotational direction after the jaw members 22 have been tightened against the shank 162 of the drill bit 160. More specifically, the spindle 20 and the threaded socket 24 will tend to co-rotate such that the first socket teeth 60 will ride over the first ring teeth 92-*b* and urge the first portion 76-*b* of the impacting ring 72-*b* in a rearward direction away from the threaded socket 24. Since the spring 70-1 biases the first portion 76-*b* of the impacting ring 72-*b* forwardly, the first socket teeth 60 will periodically strike the first ring teeth 92-*b* as the threaded socket 24 rotates and the first portion 76-*b* is urged forwardly by the spring 70-1. The impact of the first socket teeth 60 and the first ring teeth 92-*b* will generate a force that is applied to the threaded socket 24 that tends to further tighten the threaded socket 24 against the jaw members 22.

When the drill chuck 10-*c* is to be employed in a drilling or driving operation, the top cover shell 112-*b* is rotated to align the projections 86-*b* with the second locking recesses 133-*b*1 and the guide members 82-*c* with the second locking recess 133-*b*2. The second locking recesses 133-*b*1 and 133-*b*2, being relatively shallow, maintain the first and second portions 76-*b* and 78-*b* of the impacting ring 72-*b* in spaced apart relation with the threaded socket 24 so that the first and second ring teeth 92-*b* and 94-*b* are disengaged from the first and second socket teeth 60 and 62. Accordingly, the threaded socket 24 may co-rotate with the spindle 20 unimpeded by the impacting ring 72-*b*.

The top cover shell 112-*c* can be rotated to align the projections 86-*b* with the third locking recesses 134-*b*1 and the guide members 82-*c* with the third locking recesses 134-*b*2 when removal of the drill bit 160 is desired. The third locking recesses 134-*b*1, being relatively shallow, maintain the first portion 76-*b* of the impacting ring 72-*b* in a spaced apart relation with the threaded socket 24 so that the first ring teeth 92-*b* are disengaged from the first socket teeth 60, while third locking recesses 134-*b*2, being relatively deep, permits the spring 70-2 to urge the second portion 78-*b* of the impacting ring 72-*b* forwardly to permit the second ring teeth 94-*b* to engage the second socket teeth 62.

In this condition, the second ring teeth 94-*b* and the second socket teeth 66 engage one another to resist relative rotation between the second ring portion 78-*b* and the threaded socket 24. Subsequent rotation of the spindle 20 in a second rotational (i.e., loosening) direction opposite the first rotational direction causes the threaded socket 24 to rotate relative to the impacting ring 72-*b* such that the second socket teeth 62 will periodically strike the second ring teeth 94-*b*. If the impact between the second socket teeth 62 and the second ring teeth 94-*b* is insufficient to loosen the threaded socket 24 from the jaw members 22, then in a manner that is similar to that which was explained for the tightening mode, the second socket teeth 62 will skip over the second ring teeth 94-*b* and urge the second portion 78-*b* of the impacting ring 72-*b* rearwardly. The spring 70-2 will bias the second portion 78-*b* of the impacting ring 72-*b* forwardly so that on further rotation of the spindle 20 and the threaded socket 24, the second socket teeth 62 will periodically strike the second ring teeth 94-*b*. The impact of the second socket teeth 62 against the second ring teeth 94-*b* will generate a force that is applied to the threaded socket 24 that tends to loosen the threaded socket 24 from the jaw members 22 (i.e., drive the jaw members 22 away from the drill bit 160). Accordingly, the threaded socket 24 can be loosened from the jaw members 22, regardless of the speed at which the threaded socket 24 was tightened or loosened or the differences between static and dynamic coefficients of friction.

In view of the discussion above, those of ordinary skill in the art will appreciate that the first and second socket teeth 60 and 62 (and/or the first and second ring teeth 92-*b* and 94-*b*) may be different in an amount by which they are radially spaced apart from a rotational axis of the threaded socket 24; may be formed differently in shape; may be formed differently in height; and/or that the quantity of one of the sets of teeth may be different than the other set of teeth.

Figure 6:
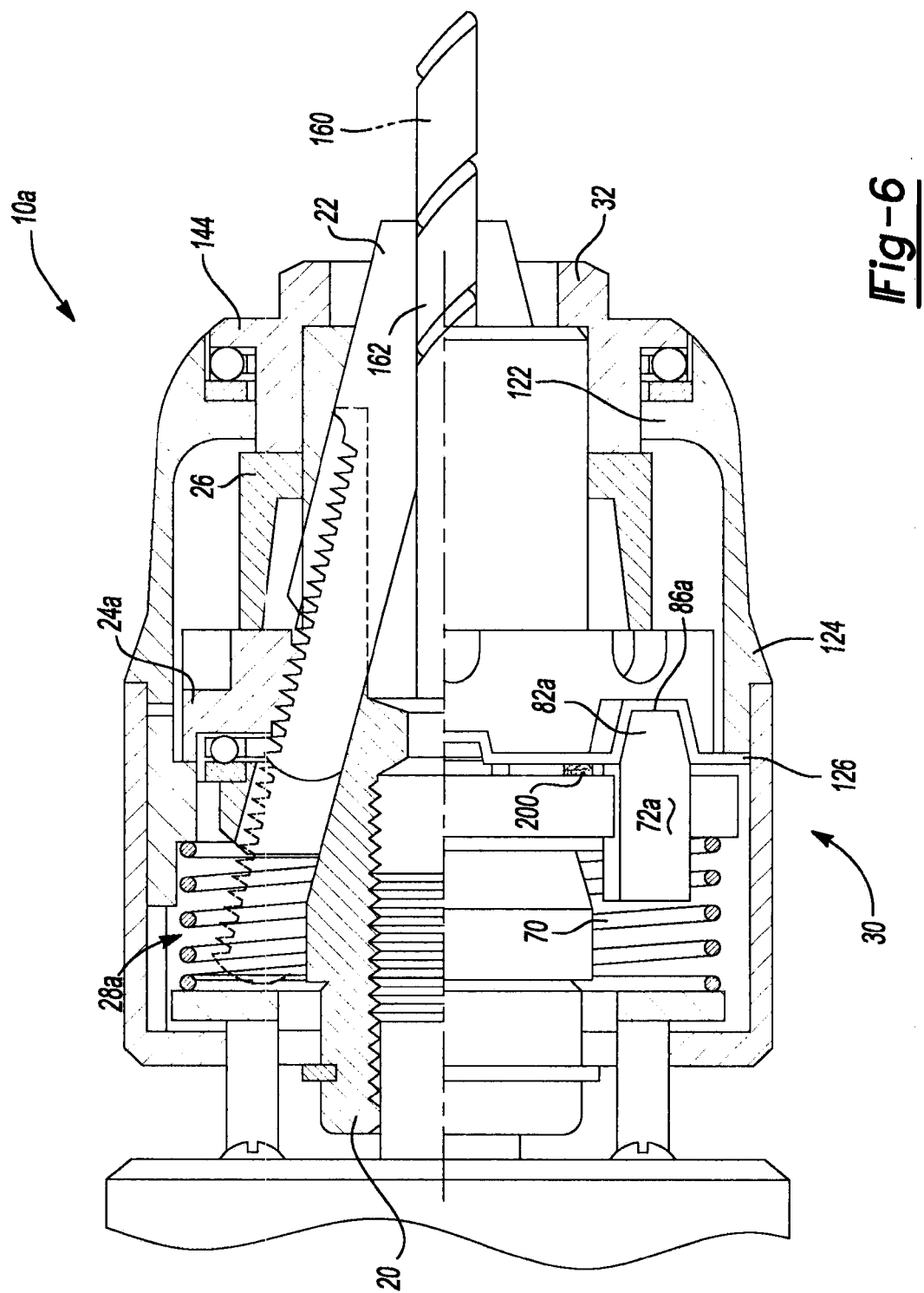
FIG. 6 is a sectional view of a portion of a second drill chuck constructed in accordance with the teachings of the present invention.
Figure 7:
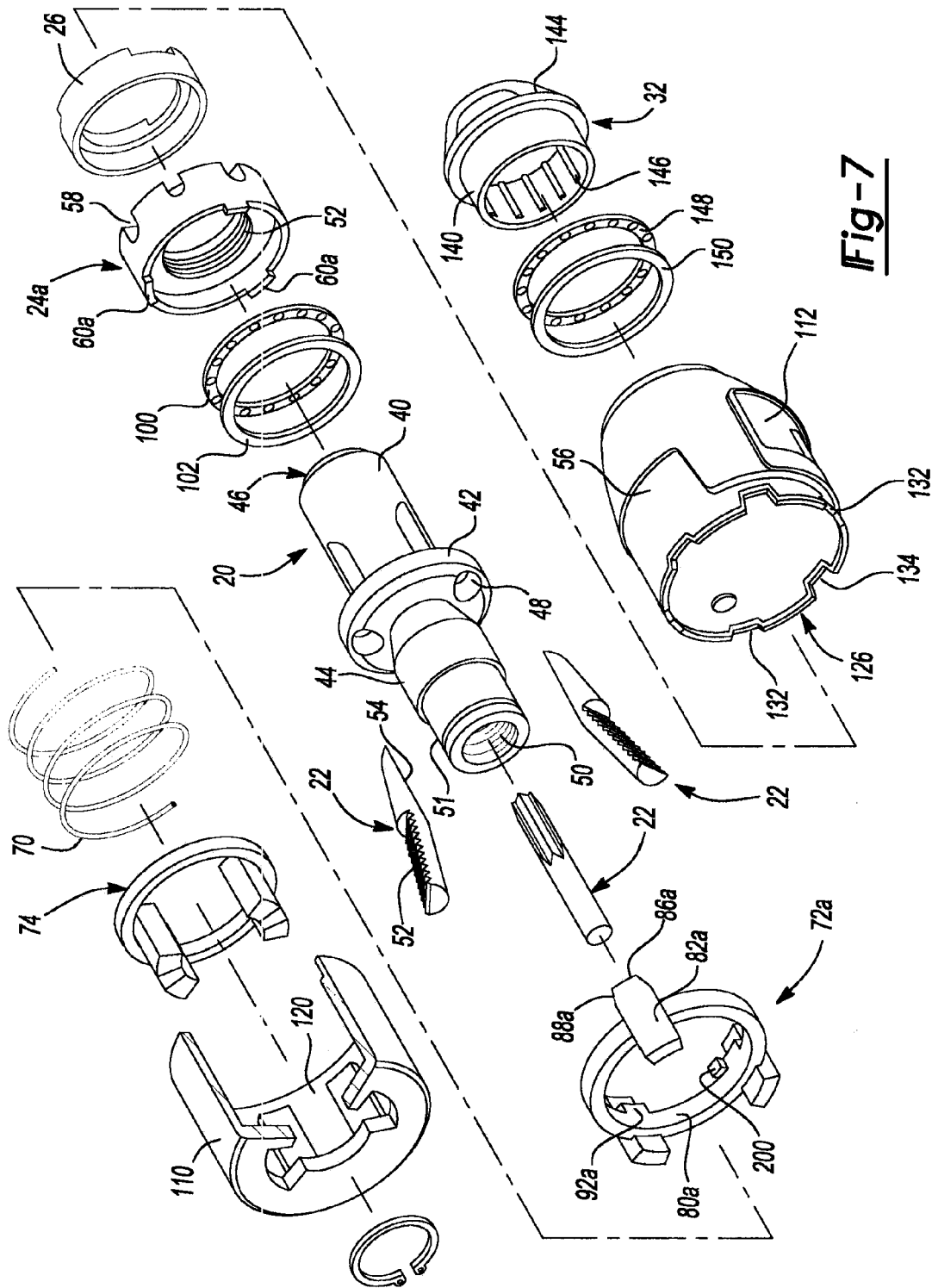
FIG. 7 is an exploded perspective view of a portion of the drill chuck of FIG. 6.
Figure 8:
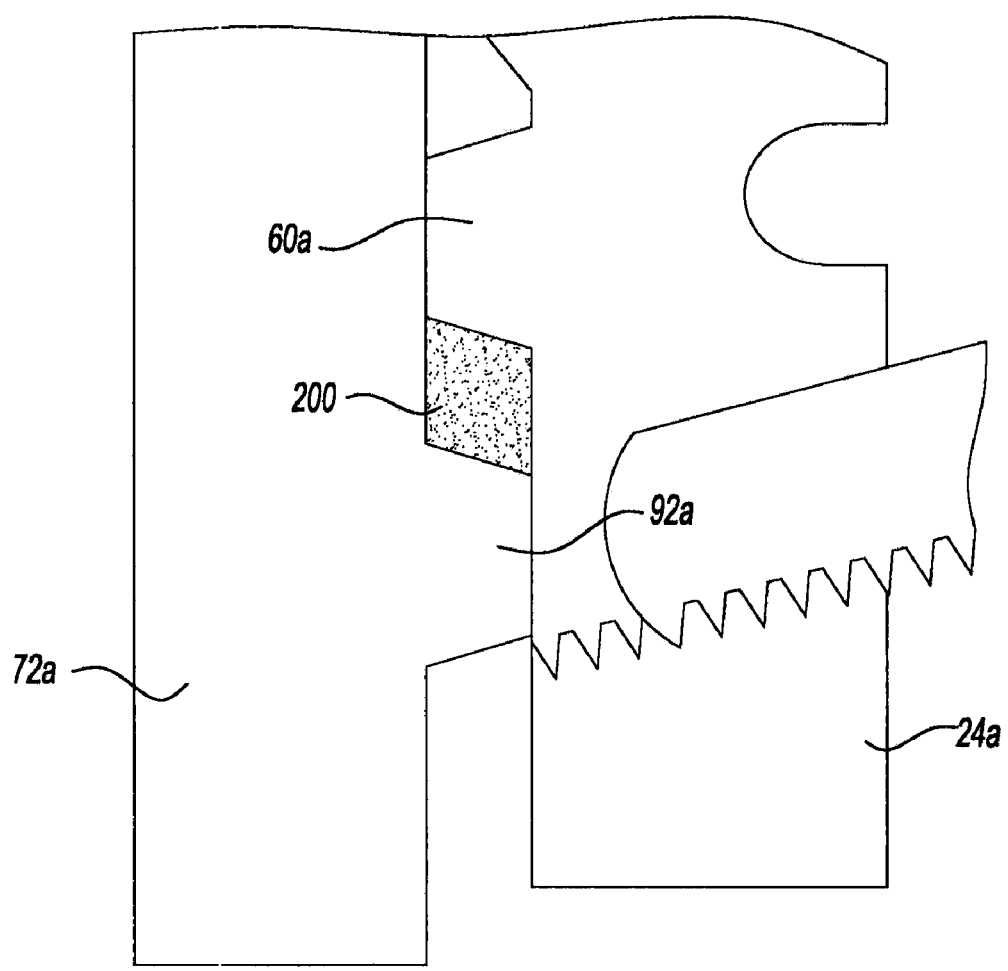
FIG. 8 is a schematic view of a portion of the drill chuck of FIG. 6 illustrating the location of the resilient element.

With reference to FIGS. 6 through 8 of the drawings, a second drill chuck constructed in accordance with the teachings of the present invention is generally indicated by reference numeral 10*a*. Except as noted herein, the drill chuck 10 is generally similar to that which is described in U.S. Pat. No. 6,247,706. The drill chuck can include a spindle 20, a plurality of jaw members 22, a threaded socket 24*a*, a socket cover 26, a thrust bearing assembly 28*a*, a cover shell or housing 30, and a sleeve 32. The spindle 20, jaw members 22, socket cover 26, cover housing 30 and sleeve 32 are generally identical to those described above in conjunction with the discussion of the drill chuck 10 and as such, these components need not be discussed in further detail.

The threaded socket 24*a* can be disposed about the spindle 20 and can have an internally tapered and threaded surface 53 that is threadably coupled with the threaded surfaces 52 of the jaw members 22. A plurality of recessed holes 58 may be formed about the exterior of the threaded socket 24a, while a plurality of socket teeth 60a can be formed on the bottom surface of the threaded socket 24a.

The thrust bearing assembly 28a can include a spring 70, which is disposed about the spindle 20, an impacting ring 72a and a joint member 74. The impacting ring 72a can be disposed about the spindle and can include an annular body 80a, a plurality of axially-extending guide members 82a, which can be coupled to the annular body 80a and can include a tooth-like projection 86a having tapered sides 88a, and a plurality of ring teeth 92a that can be disposed radially inward of the guide members 82a. The ring teeth 92a are configured to engage the socket teeth 60a. The spring 70 is disposed between the impacting ring 72a and the joint member 74 and is operable for biasing the impacting ring 72a toward the threaded socket 24a.

At least one resilient element 200 can be employed to absorb a portion of the force that is transmitted to the impacting ring 72a when the socket teeth 60a and the ring teeth 92a contact one another when the threaded socket 24a is rotated by the spindle 20 in a tightening direction (i.e., in a direction where the threaded socket 24a tends to urge the jaw members 22 inwardly toward the rotational axis of the spindle 20). In the particular example provided, the resilient element 200 is provided between the socket teeth 60a and the ring teeth 92a on a single side (i.e., a side that corresponds to the tightening of the threaded socket 24a). The resilient element 200 can be a spring, but in the particular example provided, is formed of an impact resistant, resilient plastic material that is coupled (e.g., bonded) to the ring teeth 92a.

In situations where the impacting ring 72a is employed to tighten the jaw members 22 against the shank 162 of the drill bit 160, the top cover shell 112 is rotated as described above and when the spindle 20 is driven in the first rotational direction, the socket teeth 60a will periodically strike resilient element 200 on the ring teeth 92a. The impact of the socket teeth 60a, the resilient element 200 and the ring teeth 92a will generate a torque that is applied to the threaded socket 24a and tends to further tighten the threaded socket 24a against the jaw members 22.

When removal of the drill bit 160 is desired, the top cover shell 112 is rotated as described above and the spindle 20 is driven in a second rotational direction opposite the first rotational direction, such that the socket teeth 60a will periodically strike the ring teeth 92a. The resilient element 200 is not disposed between the socket teeth 60a and the ring teeth 92a and as such, a relatively higher torque can be applied to the threaded socket 24a to loosen the threaded socket 24a and drive the jaw members 22 away from the shank 162 of the drill bit 160.

Those of ordinary skill in the art will appreciate from this disclosure that the resilient element 200 may be positioned in various different locations so as to reduce or attenuate the impact between the socket teeth 60a and the ring teeth 92a when tightening the threaded socket 24a. For example, the impacting ring 72a may be formed in two portions (see, e.g., the first and second ring portions 76 and 78 that associated with impacting ring 72 of the drill chuck 10) and the resilient element may be disposed therebetween (e.g., between the tabs 96 and an associated side wall of the grooves 84).

Figure 9:
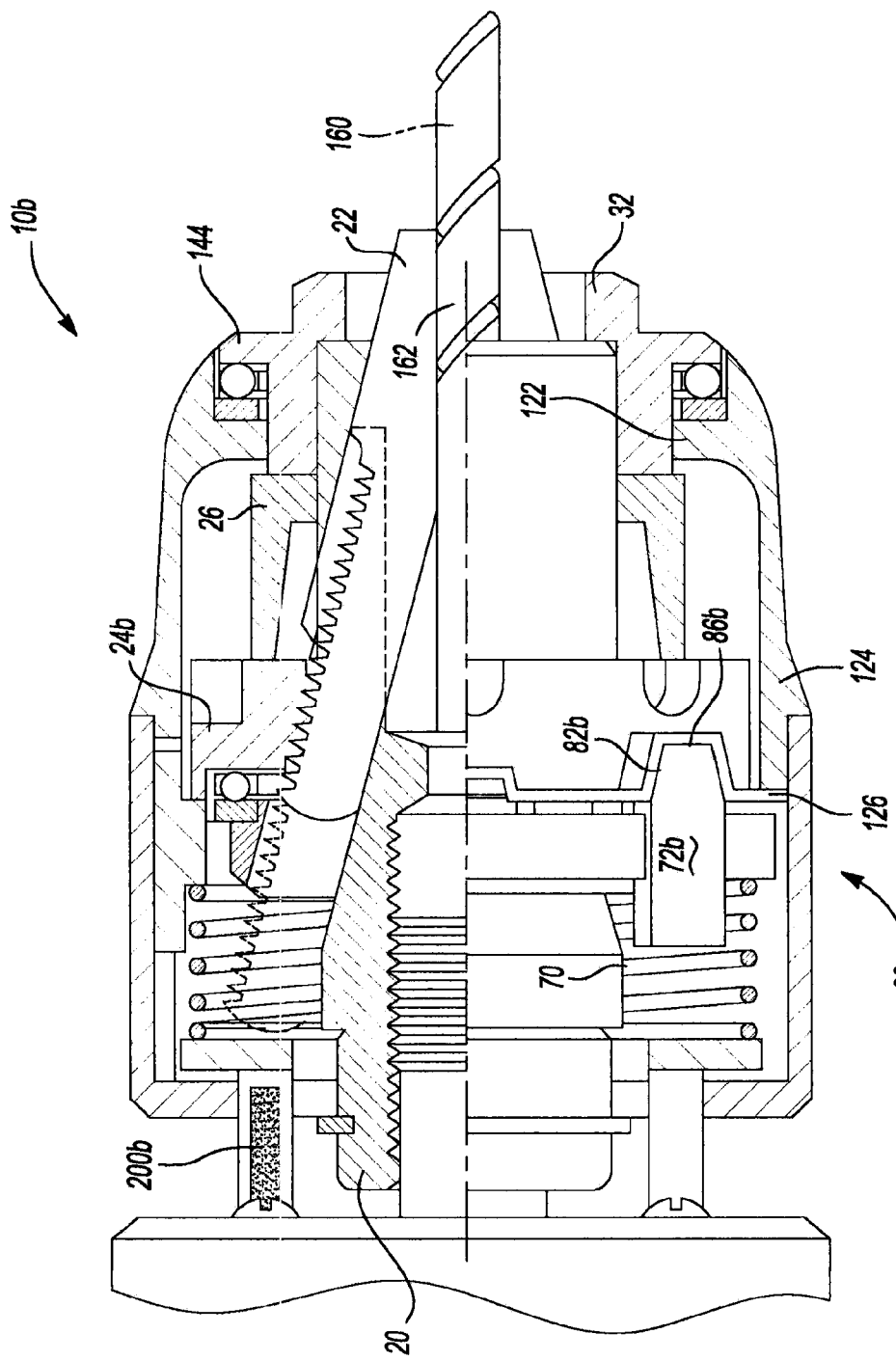
FIG. 9 is a sectional view of a portion of a third drill chuck constructed in accordance with the teachings of the present invention.
Figure 10:
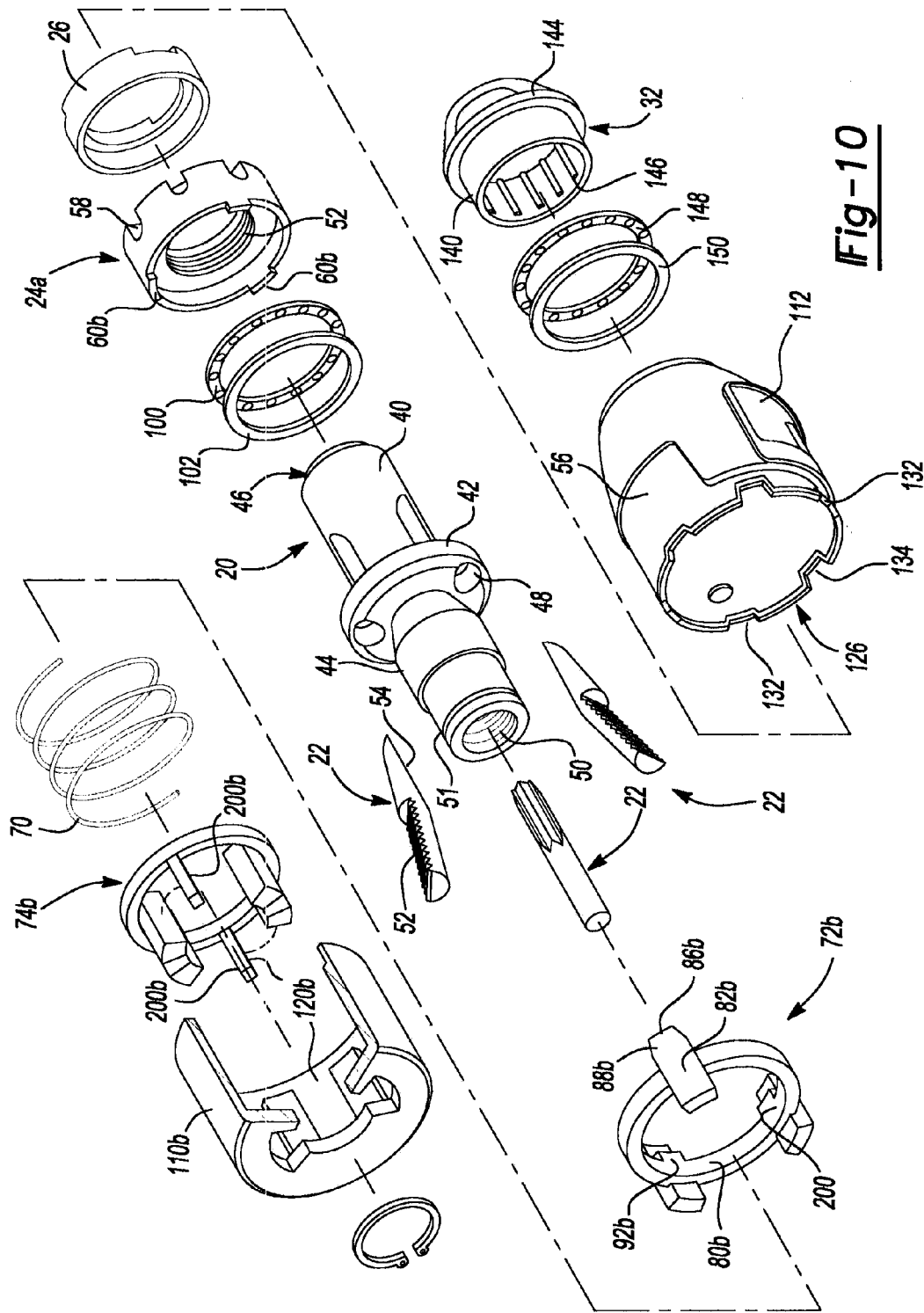
FIG. 10 is an exploded perspective view of a portion of the drill chuck of FIG. 9.

With reference to FIGS. 9 and 10 of the drawings, a third drill chuck constructed in accordance with the teachings of the present invention is generally indicated by reference numeral 10b. Except as noted herein, the drill chuck 10b is generally similar to that the drill chuck 10a described above except for the positioning of the resilient element. In this example, the socket teeth 60b of the threaded socket 24b are configured to directly strike the ring teeth 92b of impacting ring 72b to further tighten the jaw members 22 against the shank 162 of the drill 160 or loosen the jaw members 22 from the shank 162 of the drill 160. The resilient element 200b, which can be formed of a resilient material but is illustrated to be a spring in this example, can be disposed between the bottom cover shell 110b and a structure to which the bottom cover shell 110b is coupled (e.g., the joint member 74b). Accordingly, when the socket teeth 60b and the ring teeth 92b contact one another when the threaded socket 24b is rotated in the first rotational direction, the resilient element 200b will be disposed to receive a portion of the impact force. Like the previous embodiment, the resilient element 200b does not affect the torque that is applied to the threaded socket 24b when the threaded socket 24b is rotated in the second direction.

Figure 11:
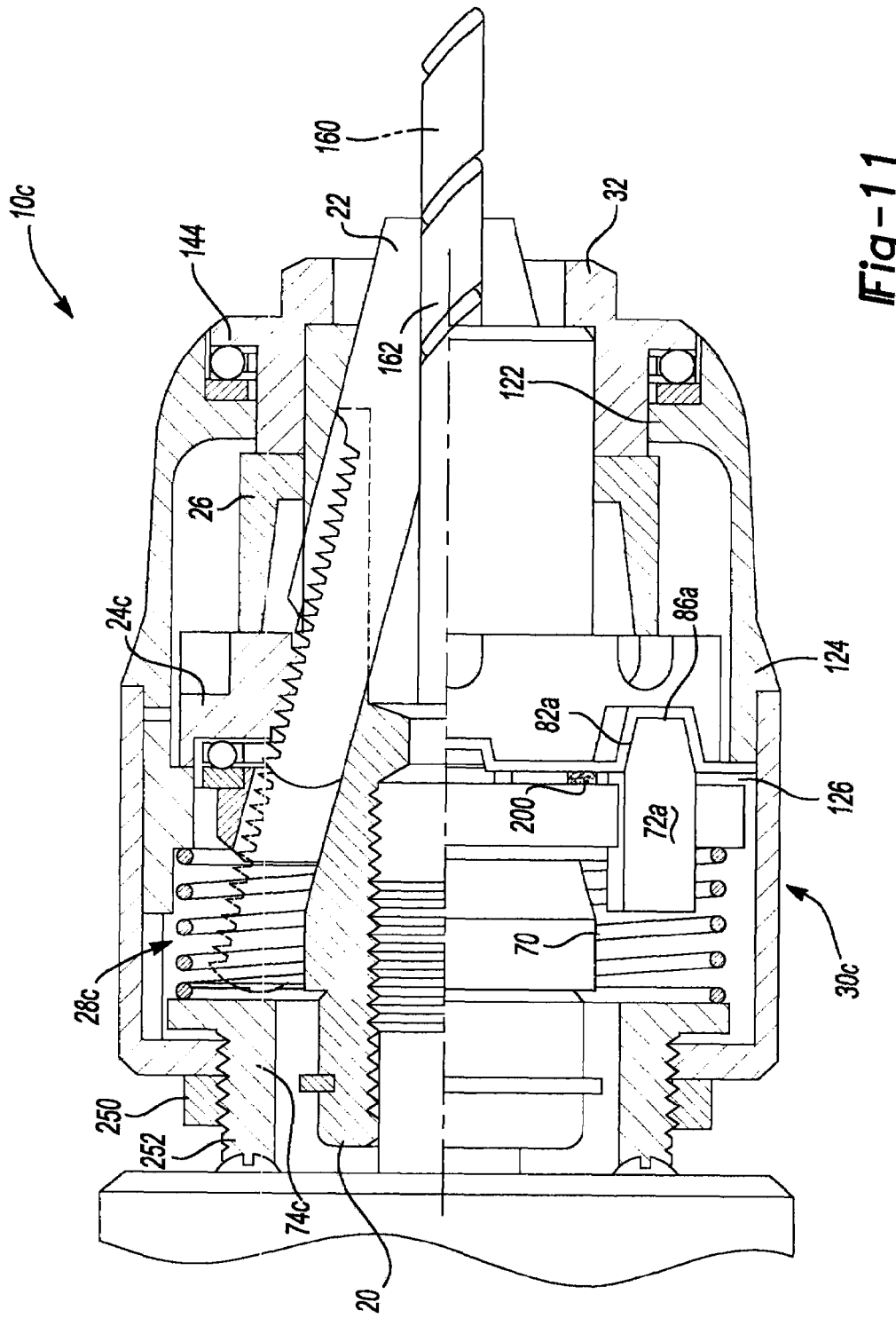
FIG. 11 is a sectional view of a fourth drill chuck constructed in accordance with the teachings of the present invention.
Figure 12:
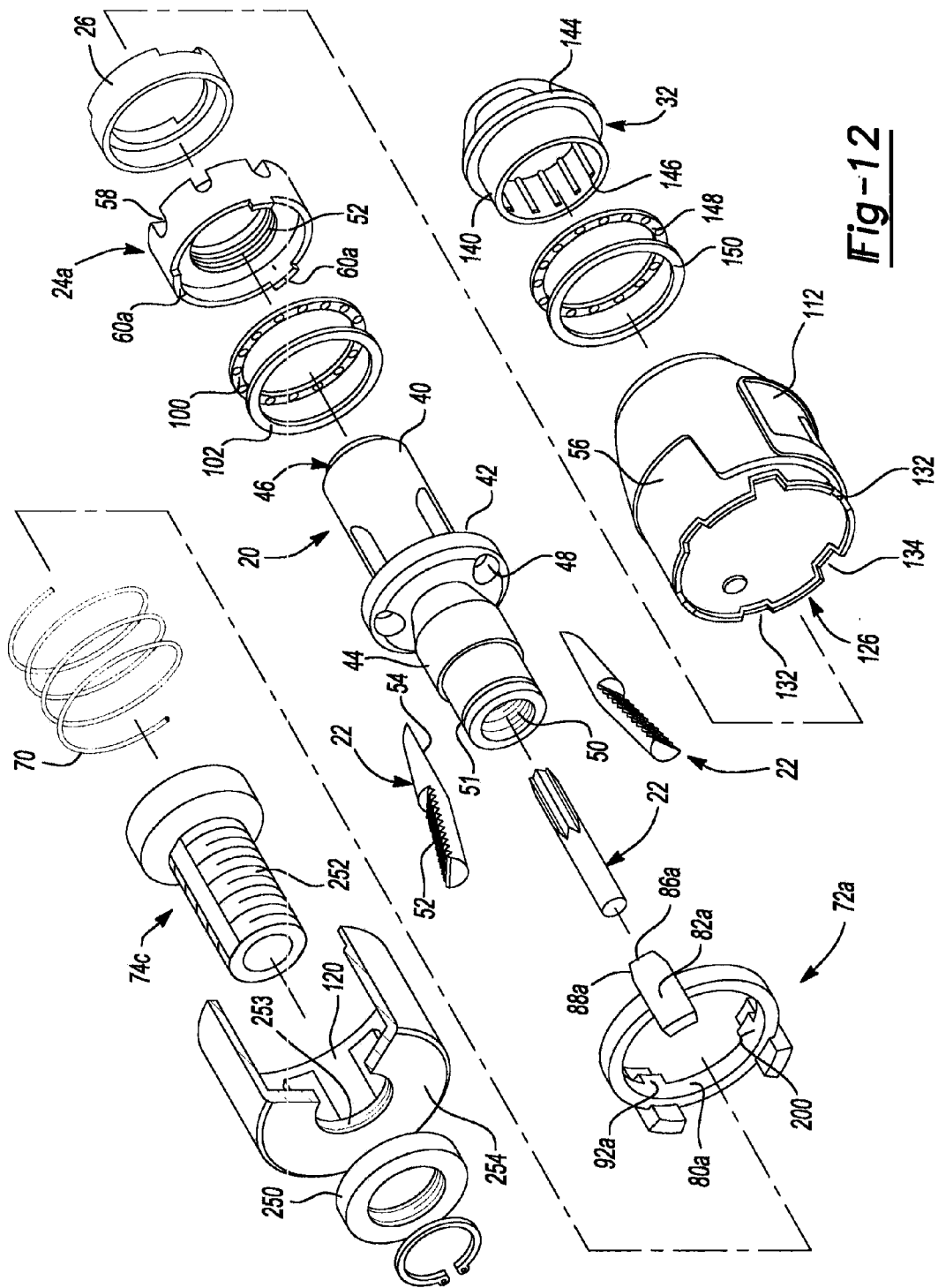
FIG. 12 is an exploded perspective view of the drill chuck of FIG. 11.

With reference to FIGS. 11 and 12 of the drawings, a fourth drill chuck constructed in accordance with the teachings of the present invention is generally indicated by reference numeral 10c. Except as noted herein, the drill chuck 10c is generally similar to the drill chuck 10a described above. Those of ordinary skill in the art will appreciate that the drill chuck 10c could be constructed in a manner that is generally similar to any of drill chucks 10, 10b or to that which is described in U.S. Pat. No. 6,247,706, for example. The drill chuck can include a spindle 20, a plurality of jaw members 22, a threaded socket 24a, a socket cover 26, a thrust bearing assembly 28c, a cover shell or housing 30c, and a sleeve 32. In the example provided, no resilient element (e.g., resilient element 200) is disposed between the teeth 60a and 92a. The spindle 20, jaw members 22, socket cover 26 and sleeve 32 are generally identical to those described above in conjunction with the discussion of the drill chuck 10, and the threaded socket is generally identical to that described above in conjunction with the discussion of the drill chuck 10a. As such, these components need not be discussed in further detail.

The thrust bearing assembly 28b can include a spring 70, which is disposed about the spindle 20, an impacting ring 72a, a joint member 74c and a threaded adjustment collar 250. The joint member 74c is generally similar to the joint member 74 discussed above, except that instead of legs that protrude rearwardly through the cover housing 30c, the joint member 74c includes a threaded sleeve 252 that threadably engages a hole 253 that is formed in the bottom cover shell 110c. The threaded adjustment collar 250 is threaded to the threaded sleeve 252 and abuts the rearward side 254 of the bottom cover shell 110c, thus acting as a jam-nut that inhibits relative rotation between the bottom cover shell 110c and the joint member 74c.

In situations where the torque that is generated by impacting ring 72a and transmitted to threaded socket 24a is insufficient to retain the drill bit 160 to or remove the drill bit 160 from the drill chuck 10c, the operator may loosen the threaded adjustment collar 250 and rotate the bottom cover shell 110c so as to further compress the spring 70 between the impacting ring 72a and the joint member 74c. Further compression of the spring 70 renders the impacting ring 72a more resistant to rearward movement when an impact involving the socket teeth 60a and the ring teeth 92a occurs and as such, relatively higher tightening and loosening torques may be generated.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A drill chuck comprising:
   a spindle that is adapted to be coupled to a source of rotational power;
   a plurality of jaw members slidably supported on the spindle;
   a threaded socket disposed about the spindle and threadably engaged with one of the jaw members and the spindle, the threaded socket including a plurality of first socket teeth and a plurality of second socket teeth that are configured differently than the first socket teeth;
   a spring disposed about the spindle;
   an impacting structure being disposed about the spindle and being biased toward the threaded socket by the spring, the impacting structure including a first set of structure teeth and a second set of structure teeth that are configured differently from the set of first structure teeth; and
   a changeover member disposed about the threaded socket and engaging the impacting structure, the changeover member being rotate-able between a first position, wherein the first and second socket teeth are axially spaced apart from the first and second structure teeth, and a second position, wherein the first and second socket teeth are not axially spaced apart from the first and second structure teeth;
   wherein the first socket teeth and the first structure teeth contact one another when the threaded socket is rotated in a first rotational direction relative to the impacting structure and the changeover member is disposed in the second position and wherein the second socket teeth and the second structure teeth contact one another when the threaded socket is rotated in a direction opposite the first rotational direction relative to the impacting structure and the changeover member is disposed in the second position.

2. The drill chuck of claim 1, wherein the first and second socket teeth are different in an amount by which they are radially spaced apart from a rotational axis of the threaded collar.

3. The drill chuck of claim 1, wherein a quantity of the first socket teeth is different from a quantity of the second socket teeth.

4. The drill chuck of claim 1, wherein the first and second socket teeth are different in shape.

5. The drill chuck of claim 1, wherein the first and second socket teeth are different in height.

6. The drill chuck of claim 1, wherein the impacting structure includes a first portion onto which the first structure teeth are formed and a second portion onto which the second structure teeth are formed, the first and second portions being coupled to one another in non-rotationally but axially-displaceable manner.

7. The drill chuck of claim 6, wherein the spring includes a first spring and a second spring that is disposed co-axially and radially inwardly of the first spring and wherein the first spring engages the first portion and the second spring engages the second portion.

* * * * *